United States Patent
Samet, Sr. et al.

(10) Patent No.: US 12,266,012 B2
(45) Date of Patent: *Apr. 1, 2025

(54) APPLIED ESSENTIA DUNNING

(71) Applicant: One True Holding Company, Lenexa, KS (US)

(72) Inventors: Nadav Samet, Sr., Sunnyvale, CA (US); Nadav Samet, Jr., Petach Tikva (IL); Ohad Samet, San Francisco, CA (US); Richard Yeung, San Francisco, CA (US)

(73) Assignee: One True Holding Company, Lenexa, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 18/378,411

(22) Filed: Oct. 10, 2023

(65) Prior Publication Data

US 2024/0221070 A1 Jul. 4, 2024

Related U.S. Application Data

(63) Continuation of application No. 17/677,230, filed on Feb. 22, 2022, now Pat. No. 11,783,413, which is a continuation of application No. 16/660,392, filed on Oct. 22, 2019, now Pat. No. 11,257,150, which is a continuation of application No. 14/836,116, filed on Aug. 26, 2015, now Pat. No. 10,453,127.

(60) Provisional application No. 62/042,339, filed on Aug. 27, 2014.

(51) Int. Cl.
G06Q 40/02 (2023.01)

(52) U.S. Cl.
CPC .................................. *G06Q 40/02* (2013.01)

(58) Field of Classification Search
CPC ........................................................ G06Q 40/02
See application file for complete search history.

(56) References Cited

U.S. PATENT DOCUMENTS

| | | | |
|---|---|---|---|
| 8,321,339 B2* | 11/2012 | Imrey | G06Q 20/4016 705/36 R |
| 10,453,127 B2 | 10/2019 | Samet, Sr. et al. | |
| 11,257,150 B2 | 2/2022 | Samet, Sr. et al. | |
| 11,783,413 B2* | 10/2023 | Samet, Sr. | G06Q 40/02 705/34 |
| 2007/0162317 A1 | 7/2007 | Papili et al. | |
| 2009/0171819 A1 | 7/2009 | Von der Emde et al. | |
| 2012/0191595 A1* | 7/2012 | Evans | G06Q 20/108 705/38 |
| 2014/0136449 A1 | 5/2014 | Bartmann | |

FOREIGN PATENT DOCUMENTS

WO 2004029850 A2 4/2004

* cited by examiner

*Primary Examiner* — Paul Danneman
(74) *Attorney, Agent, or Firm* — Sheppard Mullin Richter & Hampton LLP

(57) ABSTRACT

Dunning a debtor according to an essentia instance of the debtor. Debtor data of the debtor is received from a creditor. The debtor is mapped to an essentia to create an essentia instance for the debtor based on debtor characteristic variables identified by the debtor data and essentia characteristic variables identified by essentia data. Essentia specific dunning decisions corresponding to the essentia to apply when dunning the debtor are determined. The debtor is dunned according to the essentia specific dunning decisions.

17 Claims, 16 Drawing Sheets

APPLIED ESSENTIA DUNNING

CROSS-REFERENCE TO RELATED APPLICATIONS

This application is a continuation of U.S. patent application Ser. No. 17/677,230, filed Feb. 22, 2022, entitled "Applied Essentia Dunning," now U.S. Pat. No. 11,783,413, which is a continuation of U.S. patent application Ser. No. 16/660,392, filed Oct. 22, 2019, entitled "Applied Essentia Dunning," now U.S. Pat. No. 11,257,150, which is a continuation of U.S. patent application Ser. No. 14/836,116, filed Aug. 26, 2015, entitled "Applied Essentia Dunning," now U.S. Pat. No. 10,453,127, which claims the benefit of U.S. Patent Provisional Application No. 62/042,339, filed on Aug. 27, 2014, entitled "Applied Essentia Dunning," the entireties of which are hereby incorporated by reference.

BACKGROUND

An area of ongoing research and development is in improving dunning of debtors. In particular the development of complex communication networks have created the need to adapt dunning using such communication networks while improving the overall effectiveness of dunning.

Other limitations of the relevant art will become apparent to those of skill in the art upon reading the specification and studying of the drawings.

SUMMARY

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

The various implementations relate to dunning a debtor according to an essentia instance of the debtor. In various implementations, debtor data of the debtor is received from a creditor. Further, in various implementations, the debtor is mapped to an essentia to create an essentia instance for the debtor based on debtor characteristic variables identified by the debtor data and essentia characteristic variables identified by essentia data. In various implementations, essentia specific dunning decisions corresponding to the essentia to apply when dunning the debtor are determined. Additionally, in various implementations, the debtor is dunned according to the essentia specific dunning decisions.

These and other advantages will become apparent to those skilled in the relevant art upon a reading of the following descriptions and a study of the several examples of the drawings.

DETAILED DESCRIPTION

Figure 1:
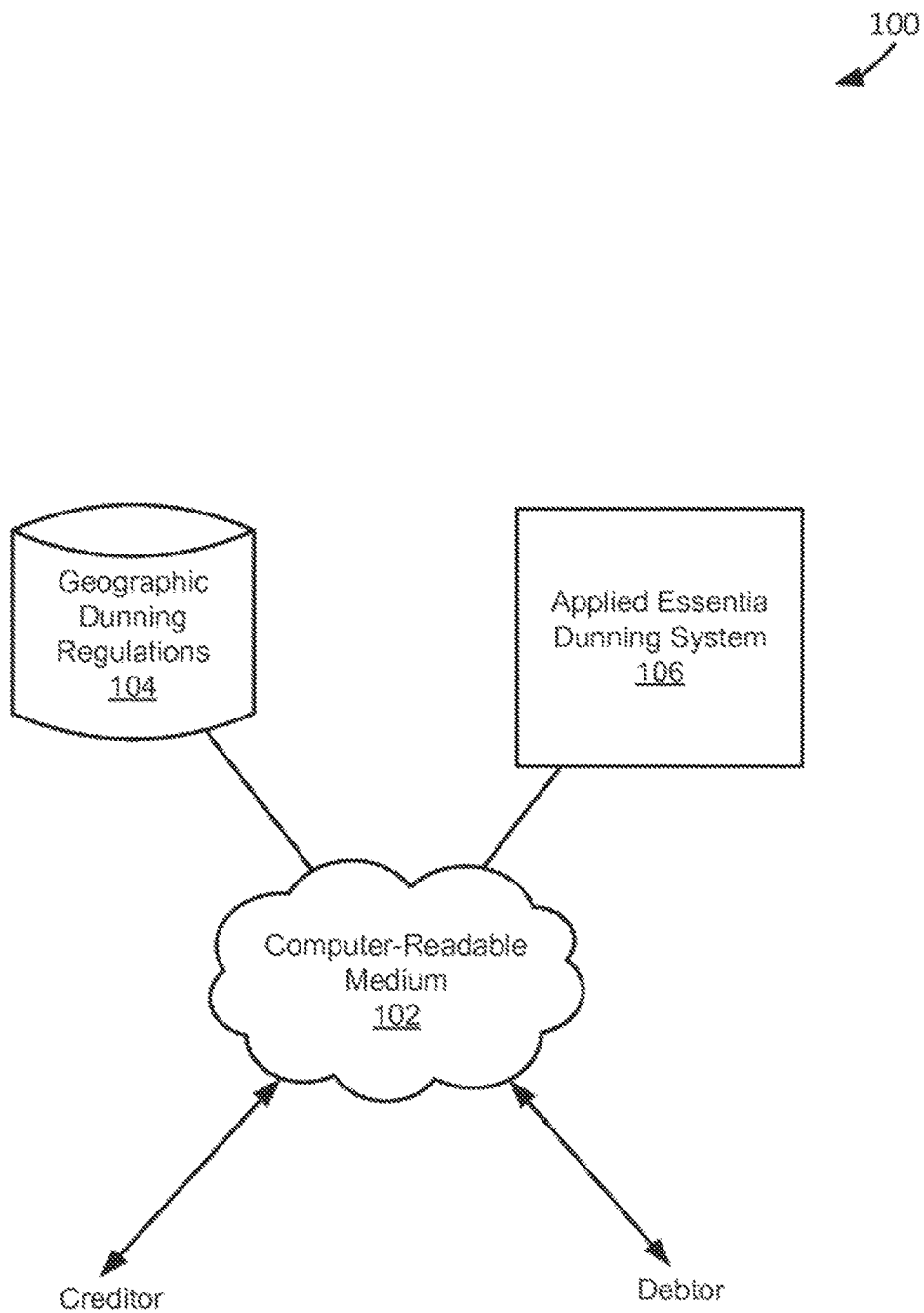
FIG. 1 depicts a diagram of an example of a system for dunning a debtor based on essentia applied to the debtor.

FIG. 1 depicts a diagram 100 of an example of a system for dunning a debtor based on essentia applied to the debtor. The system of the example of FIG. 1 includes a computer-readable medium 102, a geographic dunning regulations datastore 104, and an applied essentia dunning system 106.

The geographic dunning regulations datastore 104 and the applied essentia dunning system 106 are coupled to each other through the computer-readable medium 102. As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 is intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device, and a second component is located on a different device, the computer-readable medium 102 can include a wireless or wired back-end network or LAN. The computer-readable medium 102 can also encompass a relevant portion of a WAN or other network, if applicable.

The computer-readable medium 102, the applied essentia dunning system 106, and other applicable systems, or devices described in this paper can be implemented as a computer system, a plurality of computer systems, or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written by a direct memory access process into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software and local cache that ideally serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g., "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

The geographic dunning regulations datastore 104 functions to store, as dunning regulations data, dunning regulations for geographic regions. As used in this paper, dunning regulations are rules specifying how dunning can be performed. For example dunning regulations can specify what must be included in dunning messages and when a debtor can be contacted. Dunning regulations data stored in the geographic dunning regulations datastore 104 can include dunning regulations specific to geographic regions at an applicable geographic granularity level. For example, if dunning regulations are universal across a state, then the dunning regulations stored in the geographic dunning regulations datastore 104 can include the dunning regulations for the entire state. Similarly, if dunning regulations change by counties within a state, then the dunning regulations stored in the geographic dunning regulations datastore 104 can include dunning regulations for one or a plurality of counties within a state.

The applied essentia dunning system 106 functions to manage dunning of a debtor based on essentia of individuals applied to a debtor. As used in this paper, essentia of individuals are characteristic variables of individuals that define and segment the individuals into categories of individuals. Characteristic variables can include applicable geographic, demographic, psychographic, and behavioralistic variables of individuals. For example, characteristic variables of individuals can include a gender of an individual, an age of an individual, a region associated with an individual, whether an individual is employed, features of a job held by an individual, a job title of an individual, whether an individual has defaulted on payments for transactions in the past, likes and interests of an individual, whether an individual is in a relationship, and whether an individual owns property.

In a specific implementation, the applied essentia dunning system 106 provides an applicable interface through which a creditor can send and receive data. Data sent by a creditor can include debtor data. As used in this paper, debtor data includes data describing a debtor and/or transaction data of at least one transaction, for which the debtor has become delinquent. For example, debtor data can include contact information, e.g., a location address or an email address of a debtor, the parties to a transaction for which the debtor has become delinquent, and an amount owed by the debtor. Depending upon implementation-specific or other considerations, debtor data can include geographic, demographic, psychographic, and/or behavioralistic data of a debtor used, at least in part, to map a debtor to a category of individuals. For example, debtor data can include a gender and age of a debtor and a region in which the debtor resides or a region to which the debtor is associated. Depending upon implementation-specific or other considerations, a creditor can control dunning of debtors using an applicable interface provided by the applied essentia dunning system 106. For example, the creditor can change essentia specific dunning decisions for dunning a debtor using an applicable interface provided by the applied essentia dunning system 106.

In a specific implementation, the applied essentia dunning system 106 functions to store debtor data. Depending upon implementation-specific or other considerations, the applied essentia dunning system 106 can store debtor data received from a creditor through an applicable interface. Debtor data stored by the applied essentia dunning system 106 can include information about a debtor and transaction data of a transaction for which the debtor has become delinquent.

In a specific implementation, the applied essentia dunning system 106 functions to determine applicable dunning regulations for a debtor. The applied essentia dunning system 106 can determine applicable dunning regulations for a debtor based on dunning regulations data stored in the geographic dunning regulations datastore 104 and debtor data of the debtor. Depending upon implementation-specific or other considerations, the applied essentia dunning system 106 can determine applicable dunning regulations for a debtor based on a region a debtor lives in, as is included as part of debtor data. The applied essentia dunning system 106 can store applicable dunning regulations, determined for a debtor, as applicable dunning regulations data.

In a specific implementation, the applied essentia dunning system 106 functions to store essentia data indicating essentia of individuals. Depending upon implementation-specific or other considerations, an applicable number of different essentia of individuals creating an applicable number of categories of individuals can be defined and/or changed over time by the applied essentia dunning system 106 to modify existing categories of individuals and/or create new categories of individuals.

In a specific implementation, the applied essentia dunning system 106 functions to map debtors to categories of individuals based on essentia. In mapping debtors to a category of individuals, the applied essentia dunning system 106 can map a debtor to a category of individuals based on essentia of individuals defining the category of individuals and essentia of the debtor. Depending upon implementation-specific or other considerations, the applied essentia dunning system 106 can map debtors to a category of individuals if a threshold number of characteristic variables of the debtor match characteristic variables defining the category of individuals. Further depending upon implementation-specific or other considerations, the applied essentia dunning system 106 can map a debtor to a category of individuals based on related characteristic variables of the category of individuals and the debtor.

In a specific implementation, the applied essentia dunning system 106 functions to store essentia instance data indicating an essentia instance of a debtor. As used in this paper, an essentia instance of a debtor includes the essentia defining a category of individuals to which a debtor has been mapped. For example, essentia instance data can include the characteristic variables that define a category of individuals. For example, the applied essentia dunning system 106 can store essentia instance data indicating characteristic variables of individuals in the category of individuals to which the debtor is mapped.

In a specific implementation, the applied essentia dunning system 106 functions to store essentia specific dunning decisions data indicating dunning decisions to make based on an essentia instance of a debtor. As is used in this paper, dunning decisions include actions to take in dunning a debtor. Actions to take in dunning a debtor can include how to generate and send dunning messages to a debtor. For example, a dunning decision can specify to send a message as a plain text email in the morning to a debtor.

In a specific implementation, the applied essentia dunning system 106 functions to generate a dunning message for a debtor. Depending upon implementation-specific or other considerations, the applied essentia dunning system 106 functions to generate a dunning message for a debtor according to an essentia instance of the debtor. In generating a dunning message for a debtor according to an essentia instance of the debtor, the applied essentia dunning system 106 can use an essentia instance of a debtor and dunning decisions to make based on an essentia instance of a debtor. Further depending upon implementation-specific or other considerations, the applied essentia dunning system 106 can create a dunning message according to applicable dunning regulations for a debtor, indicated by applicable dunning regulations data.

In a specific implementation, the applied essentia dunning system 106 functions to store dunning message data for dunning messages generated by the applied essentia dunning system 106. Dunning message data can include content of a dunning message generated for a debtor. Dunning message data can also include sending instructions for a dunning message generated for a debtor.

In a specific implementation, the applied essentia dunning system 106 includes an applicable communication channel interface functioning to transmit a dunning message to a debtor across an applicable communication channel. A communication channel interface included as part of the applied essentia dunning system 106 can send a generated dunning message as indicated by dunning message data. Depending upon implementation-specific or other considerations, a communication channel interface included as part of the applied essentia dunning system 106 can send content of a dunning message to a debtor according to sending instructions for the dunning message, included as dunning message data for the dunning message. Further depending upon implementation-specific or other considerations, a communication channel interface included as part of the applied essentia dunning system 106 can transmit a dunning message to a debtor across a communication channel indicated by sending instructions for the dunning message, included as part of dunning message data for the dunning message.

In a specific implementation, the applied essentia dunning system 106 functions to store dunning event data indicating events that can occur in response to sending a dunning message to a debtor. As used in this paper, events that can occur in response to sending a dunning message to a debtor including actions and/or inactions that can be taken by the debtor in response to the sending of the dunning message to the debtor. Examples of actions and inactions that can be taken by a debtor in response to sending a dunning message to the debtor can include the debtor receiving a dunning message, the debtor viewing a dunning message, the debtor activating a link provided in a dunning message, the debtor agreeing to pay or taking steps to agreeing to pay at least part of a balance owed in a transaction, the debtor failing to view a dunning message, the debtor viewing a dunning message but not taking any further action, and the debtor sending a response to a sent dunning message. Dunning event data can also include parameters that once met indicate an occurrence of a specific event in response to sending a dunning message to a debtor.

In a specific implementation, the applied essentia dunning system 106 functions to determine and/or manage a dunning history of a debtor. As used in this paper, a dunning history of a debtor includes events occurring in response to sending a dunning message to the debtor. Events occurring in response to sending a dunning message to a debtor can include actions and/or inactions taken by the debtor in response to sending of a dunning message to the debtor.

In a specific implementation, the applied essentia dunning system 106 functions to determine events occurring in response to sending a dunning message to a debtor. In determining events occurring in response to sending a dunning message to a debtor, the applied essentia dunning system 106 can determine whether a response is received from a debtor in response to a sent dunning message. Further depending upon implementation-specific or other considerations, in determining events occurring in response to sending a dunning message to a debtor, the applied essentia dunning system 106 can determine whether a dunning message was successfully transmitted to a debtor and how the debtor interacted with the dunning message.

In a specific implementation, in determining events occurring in response to sending a dunning message to a debtor, the applied essentia dunning system 106 functions to use event data and dunning message data. For example, if event data indicates if a debtor does not respond to a dunning message within 24 hours of sending of the dubbing message, then the debtor has failed to respond to the dunning message, and dunning message data indicates that the dunning message was sent 24 hours ago, then the applied essentia dunning system 106 can determine that the debtor has failed to respond to the dunning message.

In a specific implementation, the applied essentia dunning system 106 can generate and store dunning history data for a dunning history generated and/or maintained by the applied essentia dunning system 106. Dunning history data generated by the applied essentia dunning system 106 can include applicable data related to a dunning history for a debtor. Depending upon implementation-specific or other considerations, dunning history data generated by the applied essentia dunning system 106 can include a dunning message, including an identification or content of the dunning message and/or sending instructions under which the dunning message was transmitted to the debtor, and actions and/or inactions taken by the debtor in response to transmission of the dunning message to the debtor.

In a specific implementation, the applied essentia dunning system 106 functions to improve essentia specific decisions based on a dunning history for a debtor. In improving essentia specific decisions based on a dunning history for a debtor, the applied essentia dunning system 106 can modify essentia specific dunning decisions, included as part of essentia specific dunning decisions data. Depending upon implementation-specific or other considerations, the applied essentia dunning system 106 can modify essentia specific dunning decisions for essentia of an essentia instance of a debtor if favorable dunning history and/or a favorable event in the dunning history occurs. A favorable event or history can include a history or an event that advances a debtor towards resolutions of a debt. Further depending upon implementation-specific or other considerations, the applied essentia dunning system 106 can modify essentia specific dunning decisions for essentia of an essentia instance of a debtor if unfavorable dunning history and/or an unfavorable event in the dunning history occurs. An unfavorable event or history can include a history or an event that pushes a debtor away from resolution of a debt.

In a specific implementation, the applied essentia dunning system 106 functions to modify essentia of individuals based on a dunning history for a debtor. In modifying essentia of individuals based on a dunning history for a debtor, the applied essentia dunning system 106 can change essentia of individuals, included as part of essentia data. In changing the essentia of individuals based on a dunning history for a debtor, the applied essentia dunning system 106 can function to modify characteristic variables that define and segment individuals into categories of individuals. Depending upon implementation-specific or other considerations, the applied essentia dunning system 106 can change the essentia of individuals if favorable dunning history and/or a favorable event in the dunning history occurs. Further depending upon implementation-specific or other considerations, the applied essentia dunning system 106 can change the essentia of individuals if unfavorable dunning history and/or an unfavorable event in the dunning history occurs.

Figure 2:
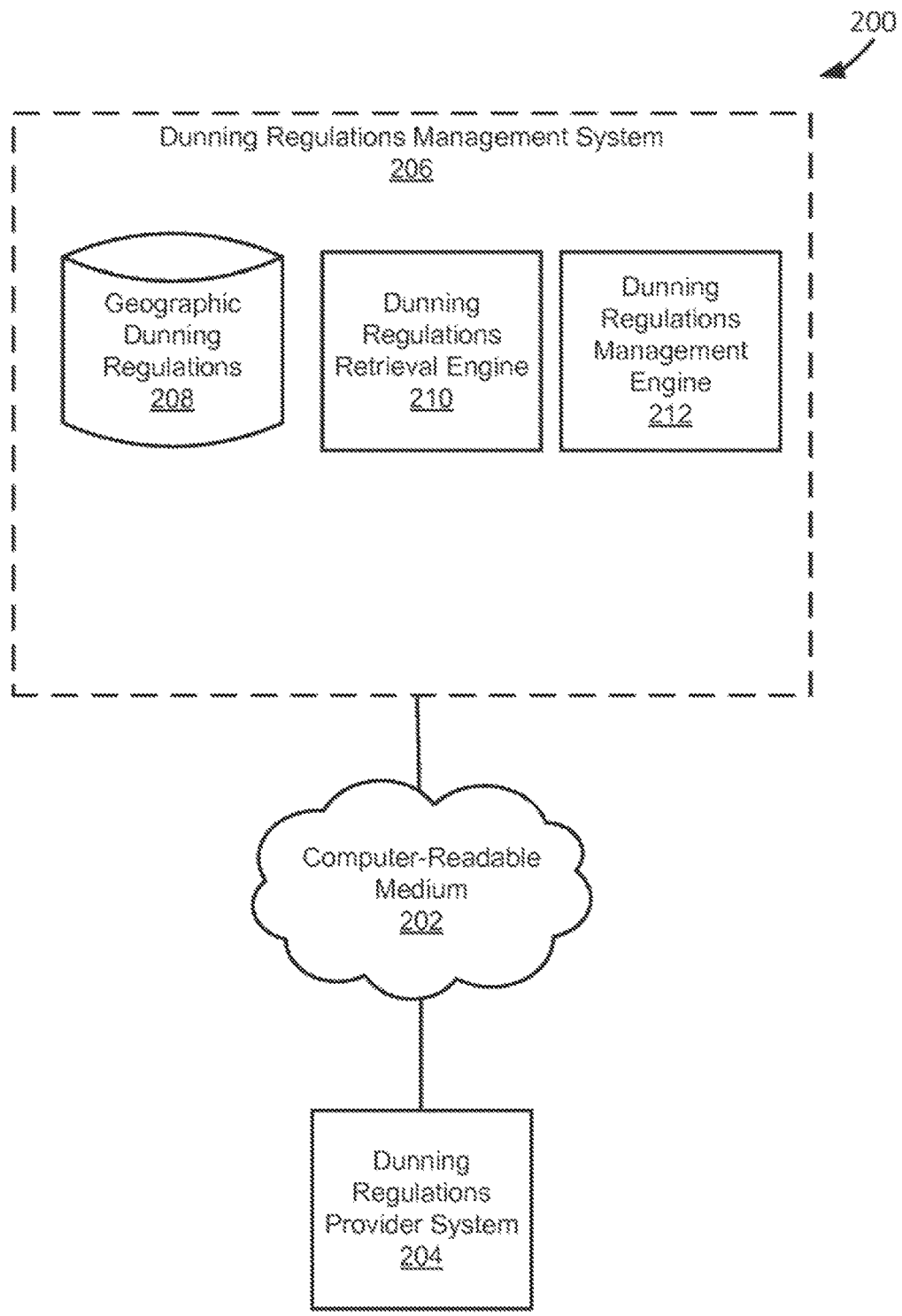
FIG. 2 depicts a diagram of an example of a system for gathering geographic specific dunning regulations.

FIG. 2 depicts a diagram 200 of an example of a system for gathering geographic specific dunning regulations. The example system shown in FIG. 2 includes a computer-readable medium 202, a dunning regulations provider system 204, and a dunning regulations management system 206. In the example system shown in FIG. 2, the dunning regulations provider system 204 and the dunning regulations management system 206 are coupled to each other through the computer-readable medium 202.

The dunning regulations provider system 204 functions to provide dunning regulations. The dunning regulations provider system 204 can be a database storing dunning regulations. Depending upon implementation-specific or other considerations, the dunning regulations provider system 204 can be specific to a geographical location. For example, the dunning regulations provider system 204 can be a county system that stores regulations and laws of the county.

The dunning regulations management system 206 functions to obtain and organize dunning regulations as part of geographic dunning regulations data. Depending upon implementation-specific or other considerations, the dunning regulations management system 206 can retrieve dunning regulations data that identifies and describes dunning regulations. For example, the dunning regulations management system 206 can retrieve dunning regulations describing dunning regulations of a city from a database storing the laws of the city. The dunning regulations management system 206 can function to organize dunning regulations data based on geographic location to create geographic dunning regulations data. For example, the dunning regulations management system 206 can associate dunning regulations of a specific county with the county to create geographic dunning regulations data.

In the example system shown in FIG. 2, the dunning regulations management system 206 includes a geographic dunning regulations datastore 208, a dunning regulations retrieval engine 210, and a dunning regulations management engine 212. The geographic dunning regulations datastore 208 functions according to an applicable datastore for storing geographic dunning regulations data, such as the geographic dunning regulations datastores described in this paper. The geographic dunning regulations datastore 208 can store geographic dunning regulations data indicating applicable laws in dunning within a specific geographical region. For example, the geographic dunning regulations datastore 208 can store geographic dunning regulations data indicating that within a specific county, a debtor can only be contacted once a day regarding a debt.

The dunning regulations retrieval engine 210 functions to retrieve dunning regulations data. The dunning regulations retrieval engine 210 can retrieve dunning regulations data from an applicable system for providing dunning regulations data. Depending upon implementation-specific or other considerations, the dunning regulations retrieval engine 210 can retrieve dunning regulations data at specific times or in response to an occurrence of a specific event. For example, the dunning regulations retrieval engine 210 can retrieve dunning regulations data after dunning regulations change for a specific geographical region. In another example, the dunning regulations retrieval engine 210 can retrieve dunning regulations data every month.

The dunning regulations management engine 212 functions to organize dunning regulations data into geographic dunning regulations data. In organizing dunning regulations data, the dunning regulations management engine 212 can group together dunning regulations data describing dunning regulations for a specific geographical region and associate the dunning regulations data with the specific geographical region.

In an example of operation of the example system shown in FIG. 2, the dunning regulations provider system 204 provides dunning regulations data describing dunning regulations for a specific geographical region. In the example of operation of the example system shown in FIG. 2, the dunning regulations retrieval engine 210 retrieves the dunning regulations data from the dunning regulations provider system 204. Further, in the example of operation of the example system shown in FIG. 2, the dunning regulations management engine 212 associates the dunning regulations data retrieved by the dunning regulations retrieval engine 210 with the specific geographical region to create geographic dunning regulations data stored in the geographic dunning regulations datastore 208.

Figure 3:
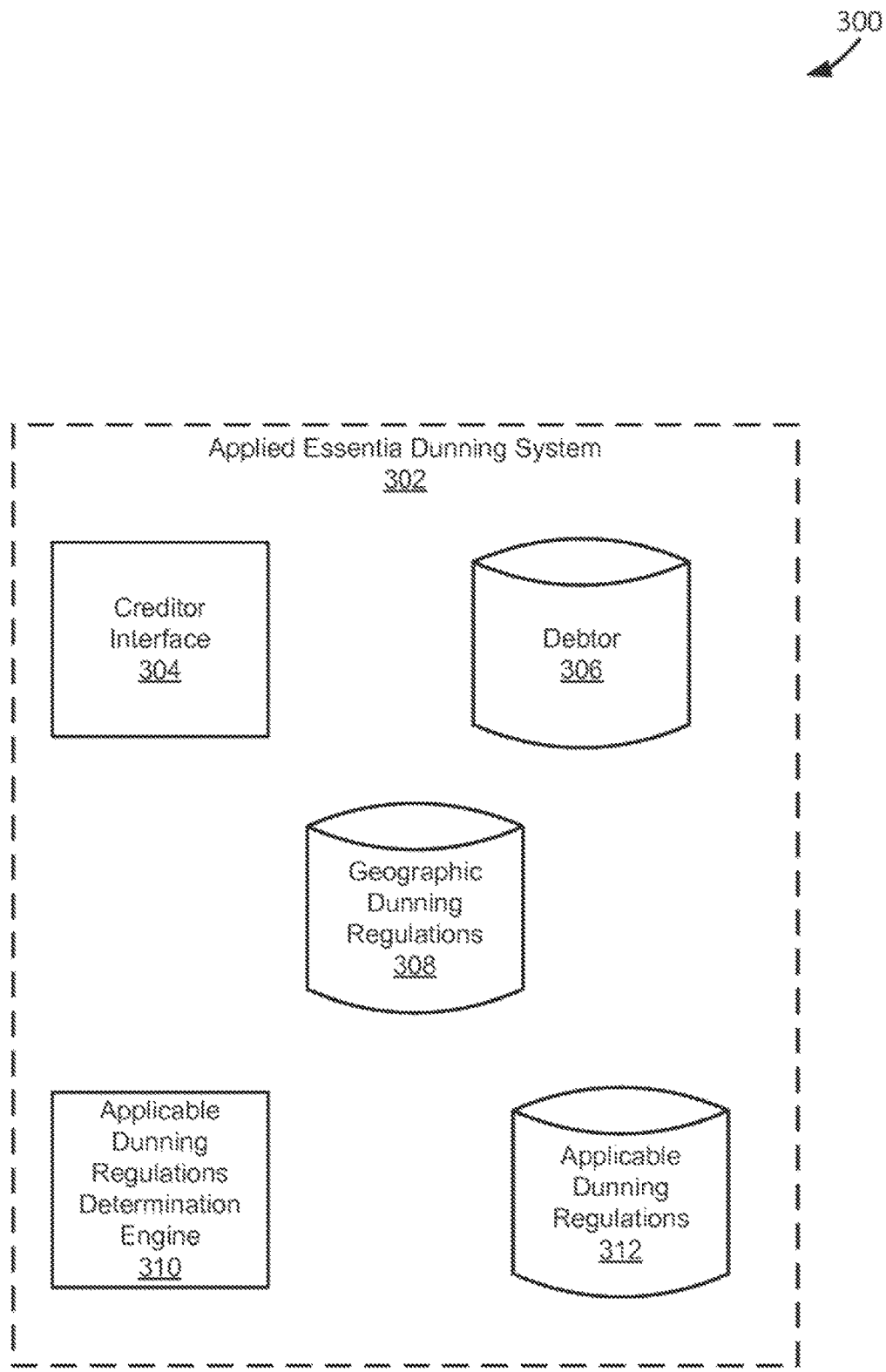
FIG. 3 depicts a diagram of an example of a system for determining applicable dunning regulations to apply in dunning a debtor.

FIG. 3 depicts a diagram 300 of an example of a system for determining applicable dunning regulations to apply in dunning a debtor. The example system shown in FIG. 3 includes an applied essentia dunning system 302. The applied essentia dunning system 302 functions according to an applicable system for dunning a debtor according to an essentia applied to the debtor, such as the applied essentia dunning systems described in this paper. In the example system shown in FIG. 3, the applied essentia dunning system 302 includes a creditor interface 304, a debtor datastore 306, a geographic dunning regulations datastore 308, an applicable dunning regulations determination engine 310, and an applicable dunning regulations datastore 312.

The creditor interface 304 functions to provide a portal through which a creditor can input data used in dunning debtors based on applied essentias. The creditor interface 304 can be used to provide debtor data of a debtor and input related to the management of essentia specific dunning decisions. For example, through the creditor interface 304, a creditor can change an essentia specific dunning decision specifying to send emails to a debtor to specify sending text messages to a debtor. Depending upon implementation-specific or other considerations, the creditor interface 304 can be implemented, at least in part, through a web based application accessed through a web browser executing at a device of a creditor or a native application executing at the device of the creditor.

The debtor datastore 306 functions to store debtor data. The debtor datastore 306 can store debtor data specific to a debtor or a creditor. For example, the debtor datastore 306 can store debtor data describing contact information of a debtor and an amount owed by the debtor. In another example, the debtor datastore 306 can store debtor data of all debtors to a specific creditor. Debtor data stored in the debtor datastore 306 can include indicators of identifications of either or both debtors or creditors. As a result, debtor data stored in the debtor datastore 306 can be used to apply debtor specific or creditor specific dunning decisions, included as part of essentia specific dunning decisions, used in dunning. For example, if debtor data indicates that a debtor owes a debt to a specific creditor, and creditor specific dunning decisions indicate that the specific creditor prefers that all communications with debtors should be done through email, then in dunning the debtor, then based on the debtor data indicating the creditor is associated with the debtor, all communications with the debtor can be through email.

The geographic dunning regulations datastore 308 functions according to an applicable datastore for storing geographic dunning regulations data, such as the geographic dunning regulations datastores described in this paper. The geographic dunning regulations datastore 308 can store geographic dunning regulations data created from dunning regulations data. For example, the geographic dunning regulations datastore 308 can store geographic dunning regulations data generated by associating dunning regulations data with specific geographic regions.

The applicable dunning regulations determination engine 310 functions to determine applicable dunning regulations to apply when dunning a specific debtor. The applicable dunning regulations determination engine 310 can determine applicable dunning regulations based on debtor data and geographic dunning regulations data. Specifically, the applicable dunning regulation determination engine 310 can determine a geographic region associated with a debtor from debtor data, and determine applicable dunning regulations from geographic dunning regulations data using the geographic region associated with a debtor. A geographic region associated with a debtor can include a geographic region in which the debtor lives, a geographic region in which the debtor is registered to vote, or a geographic region in which the debtor is located.

The applicable dunning regulations datastore 312 functions to store applicable dunning regulations data indicating applicable dunning regulation to apply to a debtor. The applicable dunning regulations datastore 312 can store dunning regulations data determined from debtor data and geographic dunning regulations data.

In an example of operation of the example system shown in FIG. 3, the creditor interface provides a portal through which a creditor can provide debtor data used in dunning a debtor. In the example of operation of the example system shown in FIG. 3, the debtor datastore 306 stores the debtor data provided by the creditor through the creditor interface 304. Further, in the example of operation of the example system shown in FIG. 3, the geographic dunning regulations datastore 308 stores geographic dunning regulations data indicating geographic dunning regulations. In the example of operation of the example system shown in FIG. 3, the applicable dunning regulations determination engine 310 determines applicable dunning regulations for the debtor based on the debtor data stored in the debtor datastore 306 and geographic dunning regulations data stored in the geographic dunning regulations datastore 308. The applicable dunning regulations datastore 312 stored applicable dunning regulations data indicating the applicable dunning regulations determined by the applicable dunning regulations determination engine 310.

Figure 4:
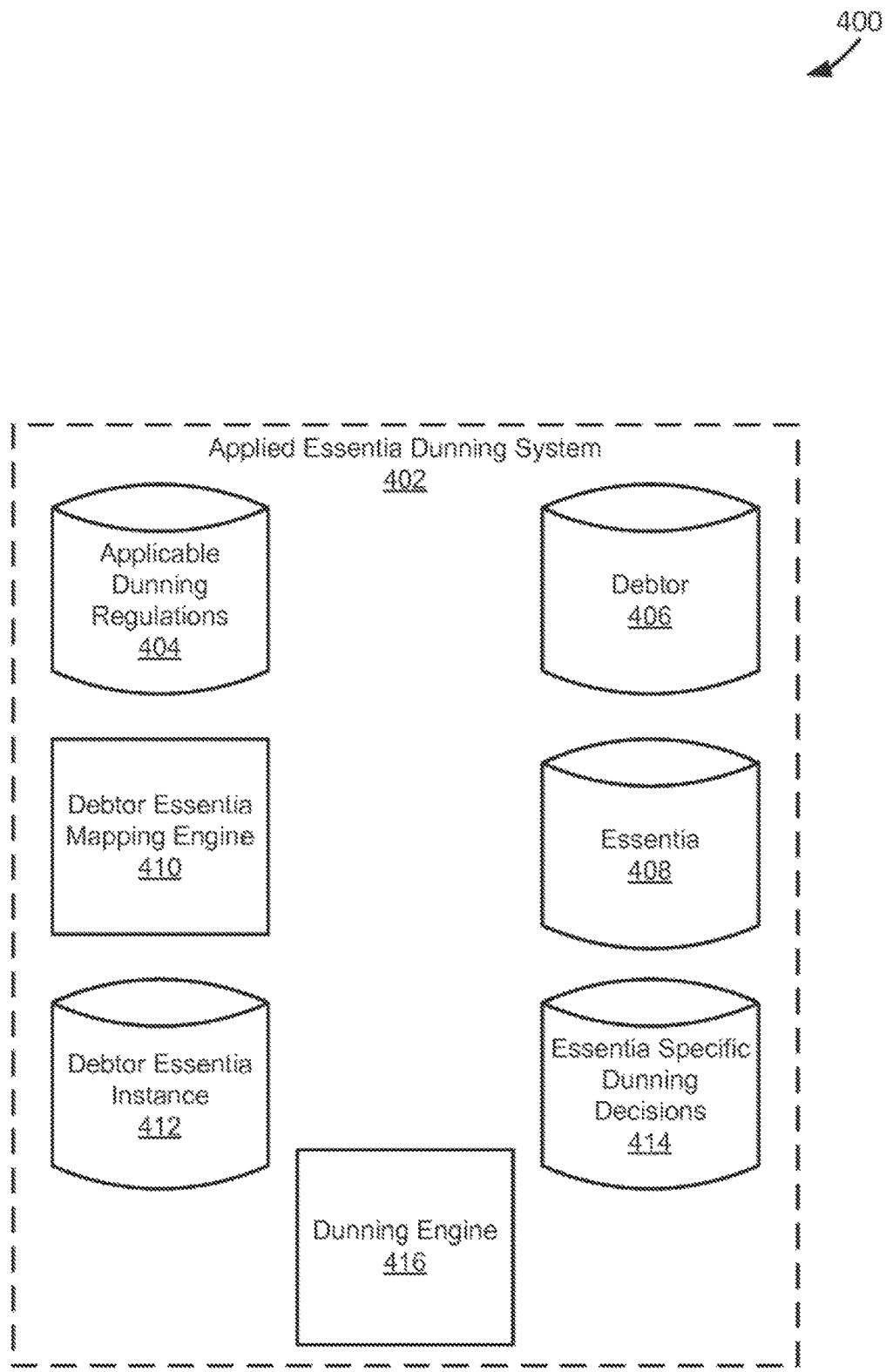
FIG. 4 depicts a diagram of an example of a system for dunning a debtor according to an essentia instance of the debtor.

FIG. 4 depicts a diagram 400 of an example of a system for dunning a debtor according to an essentia instance of the debtor. The example system shown in FIG. 4 includes an applied essentia dunning system 402. The applied essentia dunning system 402 functions according to an applicable system for dunning a debtor according to an essentia applied to the debtor, such as the applied essentia dunning systems described in this paper. In the example system shown in FIG. 4, the applied essentia dunning system 402 includes an applicable dunning regulations datastore 404, a debtor datastore 406, an essentia datastore 408, a debtor essentia mapping engine 410, a debtor essentia instance datastore 412, an essentia specific dunning decisions datastore 414, and a dunning engine 416.

The applicable dunning regulations datastore 404 functions according to an applicable datastore for storing applicable dunning regulations data indicating applicable dunning regulations for dunning a debtor, such as the applicable dunning regulations datastores described in this paper. The applicable dunning regulations datastore 404 can store applicable dunning regulations determined for a specific debtor based on debtor data of the debtor and geographic dunning regulations data. For example, applicable dunning regulations data stored in the applicable dunning regulations datastore 404 can be determined based on a specific geographical region associated with a debtor, as indicated by debtor data, and dunning regulations corresponding to the specific geographical region.

The debtor datastore 406 functions according to an applicable datastore for storing debtor data, such as the debtor datastore described in this paper. The debtor datastore 406 can store debtor data provided from a creditor through a creditor interface. Debtor data stored in the debtor datastore 406 can include an identification of a debtor, a geographical region associated with a debtor, and other applicable characteristic variables of the debtor.

The essentia datastore 408 functions according to store essentia data. Essentia data indicates essentias to which a debtor can be mapped to create an essentia instance of the debtor. Essentia data can include characteristic variables that define subsets of individuals to which a debtor can be mapped. For example, if a debtor is a 30 year old male residing in a specific state, then essentia data can define a subset of individuals that includes 30 year old males residing in the specific state to which the debtor can be mapped.

In a specific implementation, essentia data stored in the essentia datastore 408 can change over time to define new essentia and/or modify currently existing essentia. Specifically, essentia data stored in the essentia datastore 408 can change to define new subsets of individuals based on changing or newly defined or discovered characteristic variables. For example if characteristic variables include males within a specific country, and new characteristic variables are discovered defining males within a first region and a second region within the country, then the essentia data stored in the essentia datastore 408 can be modified to define a new essentias identifying characteristic variables of males within the first region and males within the second region.

The debtor essentia mapping engine 410 functions to map a debtor to an essentia to create a debtor essentia instance. The debtor essentia mapping engine 410 can map a debtor to an essentia based on characteristic variables of the debtor, as indicated by debtor data for the debtor, and characteristic variables of groups of individuals, indicated by essentia data. Depending upon implementation-specific or other considerations, the debtor essentia mapping engine 410 can map a debtor to an essentia based on whether a threshold number of characteristic variables of the debtor match characteristic variables of an essentia of a group of individuals. For example, the debtor essentia mapping engine 410 can map a debtor to an essentia if 50% of the characteristic variables of the debtor match characteristic variables defining the essentia. Further depending upon implementation-specific or other considerations, the debtor essentia mapping engine 410 can map a debtor to an essentia based on whether characteristic variables of the debtor are related to characteristic variables defining an essentia. For example, if 50% of characteristic variables of a debtor are related to 50% of characteristic variables defining a specific essentia, then the debtor essentia mapping engine 410 can map the debtor to the specific essentia.

The debtor essentia instance datastore 412 functions to store debtor essentia instance data. Debtor essentia instance data identifies an essentia that a debtor has been mapped to in creating a debtor essentia instance of the debtor. Debtor essentia instance data can indicate the characteristic variables defining an essentia to which a debtor has been mapped to create a debtor essentia instance of the debtor. For example, debtor essentia instance data can specify that a debtor is a male who is thirty years old, lives in a specific state, and works at a specific job.

The essentia specific dunning decisions datastore 414 functions to store essentia specific dunning decisions data describing essentia specific dunning decisions to apply when dunning a debtor. Essentia specific dunning decisions indicated by essentia specific dunning decisions data stored in the essentia specific dunning decisions datastore 414 can be specific to essentia that debtors are mapped to and/or creditors of the debtors. For example, essentia specific dunning decisions for a first creditor can specify to only communicate with debtors through email, while essentia specific dunning decisions for a second creditor can specify to only communicate with debtors through short messaging service (hereinafter referred to as "SMS") messages.

In a specific implementation, the essentia specific dunning decisions datastore 414 stores essentia specific dunning decisions data that changes over time. Depending upon implementation-specific or other considerations, the essentia specific dunning decisions datastore 414 can store essentia specific dunning decisions data that changes based on levels of success in dunning debtors according to the essentia specific dunning decisions. For example, if success is achieved in dunning debtors within a specific essentia by contacting them twice daily, then the essentia specific dunning decisions data stored in the essentia specific dunning decisions datastore 414 can be modified to indicate contacting debtors twice daily if they are in the specific essentia. Success can be defined based on whether all or a portion of an owed amount in a transaction is received, whether a response is elicited from a debtor, and/or whether positive feedback is received from a debtor. Further depending upon implementation-specific or other considerations, a creditor can modify essentia specific dunning decisions data stored in the essentia specific dunning decisions datastore 414. For example, a creditor can modify essentia specific dunning decisions data to indicate communicate with debtors of the creditor only through email.

The dunning engine 416 functions to managing dunning of a debtor according to a debtor essentia instance of the debtor, as indicated by debtor essentia instance data. In managing dunning of a debtor, the dunning engine 416 can generate dunning instructions specifying how to dun the debtor and dunning messages to send to the debtor. Depending upon implementation-specific or other considerations, in managing dunning a debtor according to a debtor essentia instance, the dunning engine 416 can use debtor data. For example, the dunning engine 416 can determine a contact address of a debtor from debtor data, and subsequently dun the debtor through the contact address. Further depending upon implementation-specific or other considerations in managing dunning a debtor according to a debtor essentia instance, the dunning engine 416 can manage dunning of a debtor according to essentia specific dunning decisions indicated by essentia specific dunning decisions data. Specifically, the dunning engine 416 can determine essentia specific dunning decisions corresponding to an essentia instance of a debtor. For example, if a debtor is mapped to a specific essentia, and essentia specific dunning decisions for the specific essentia indicate to attempt to contact a debtor twice every day, then the dunning engine 416 can generate instructions specifying to attempt to contact the debtor twice every day.

In an example of operation of the example system shown in FIG. 4, the applicable dunning regulations datastore 404 stores applicable dunning regulations data indicating application dunning regulations to apply when dunning a debtor. In the example of operation of the example system shown in FIG. 4, the debtor datastore 406 stores debtor data of the debtor. Further, in the example of operation of the example system shown in FIG. 4, the essentia datastore 408 stores essentia data describing essentias to which the debtor can be mapped. In the example of operation of the example system shown in FIG. 4, the debtor essentia mapping engine 410 maps the debtor to an essentia to create an essentia instance of the debtor, as indicated by debtor essentia instance data stored in the debtor essentia instance datastore 412. Additionally, in the example of operation of the example system shown in FIG. 4, the essentia specific dunning decisions datastore 414 stores essentia specific dunning decisions data describing essentia specific dunning decisions to apply when dunning debtors. In the example of operation of the example system shown in FIG. 4, the dunning engine 416 uses the applicable dunning regulations data stored in the applicable dunning regulations datastore 404, the debtor data stored in the debtor datastore 406, the debtor essentia instance data stored in the debtor essentia instance datastore 412, and the essentia specific dunning decisions data stored in the essentia specific dunning decisions datastore 414 to manage dunning of the debtor.

Figure 5:
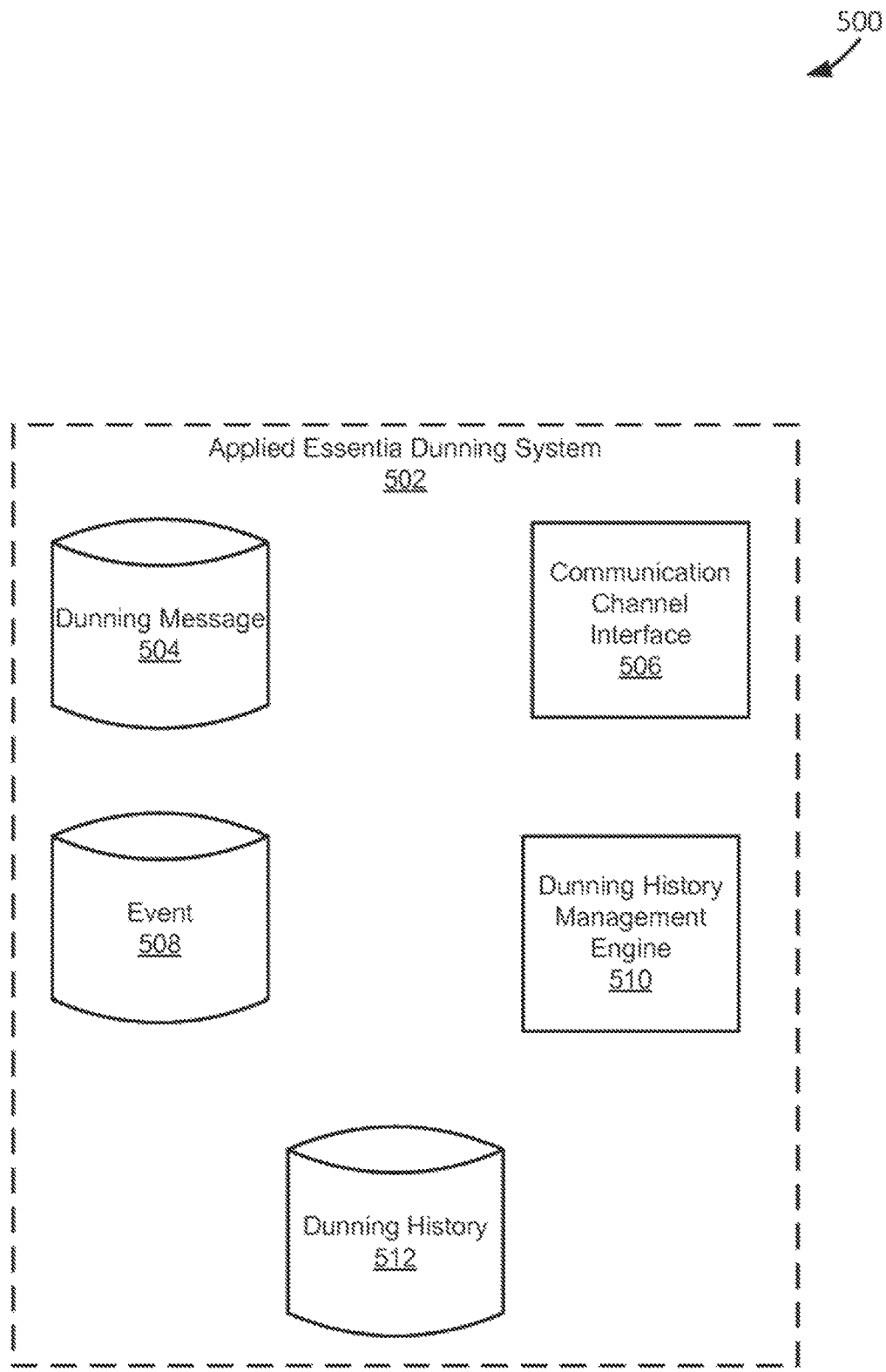
FIG. 5 depicts a diagram of an example of a system for managing a dunning history created by dunning a debtor according to an essentia instance of the debtor.

FIG. 5 depicts a diagram 500 of an example of a system for managing a dunning history created by dunning a debtor according to an essentia instance of the debtor. The example system shown in FIG. 5 includes an applied essentia dunning system 502. The applied essentia dunning system 502 functions according to an applicable system for dunning a debtor according to an essentia applied to the debtor, such as the applied essentia dunning systems described in this paper. In the example system shown in FIG. 5, the applied essentia dunning system 502 includes a dunning message datastore 504, a communication channel interface 506, an event datastore 508, a dunning history management engine 510, and a dunning history datastore 512.

The dunning message datastore 504 functions to store dunning message data. Dunning message data stored in the dunning message datastore 504 can indicate dunning instructions for dunning a debtor, as generated by an applicable system for managing dunning of a debtor according to an applied essentia, such as the dunning engines described in this paper. Dunning message data stored in the dunning message datastore 504 can also include messages, including content of messages, to send to a debtor as part of dunning, a communication address at which to contact a debtor, and/or a communication channel by which to contact a debtor.

The communication channel interface 506 functions to transmit data for dunning a debtor. The communication channel interface 506 can transmit dunning messages, as indicated by dunning message data. Depending upon implementation-specific or other considerations, the communication channel interface 506 can transmit dunning messages over a specific interface, as indicated by dunning message data. For example, if dunning message data include dunning instructions that require that dunning messages be sent to a debtor through email, then the communication channel interface 506 can transmit a dunning message to the debtor through email. The communication channel interface 506 can transmit dunning messages to a debtor according to dunning instructions for the debtor. For example, if dunning instructions for a dunning message indicate that the dunning message is to be transmitted to the debtor at 4:00 in the afternoon, then the communication channel interface 224 can send the dunning message at 4:00 in the afternoon.

The event datastore 508 functions to store dunning event data. Dunning event data stored in the event datastore 508 indicates dunning events that can occur in response to sending of a dunning message to a debtor. Dunning events can include actions or inactions taken by a debtor in response to receiving a dunning message. Dunning event data stored in the event datastore 508 can also include parameters that once met indicate an occurrence of a specific event in response to sending a dunning message to a debtor. For example, dunning event data can include a parameter specifying if a response is not received from a debtor 24 hours after sending of a dunning message to the debtor, then the debtor has ignored the dunning message.

The dunning history management engine 510 functions to determine and manage a dunning history of a debtor. A dunning history of a debtor can include a copy of a dunning message sent to a debtor, when the dunning message was sent to the debtor, and events occurring as a result of the sending of the dunning message to the debtor. For example, a dunning history can include whether a debtor viewed a dunning message sent to them and whether they responded to the dunning message. Depending upon implementation-specific or other considerations, the dunning history management engine 510 can determine events in response to a debtor receiving a dunning message utilizing dunning event data. For example, if dunning event data includes a parameter specifying that a debtor has ignored a message if a response is not received from a debtor 24 hours after sending of a dunning message to the debtor, and the dunning history management engine 510 determines that a response is not received within 24 hours, then the dunning history management engine 510 can determine that the debtor has ignored the message. The dunning history management engine 510 can determine the occurrence of an event based on responses received from the debtor or lack thereof through an applicable interface, such as the communication channel interfaces described in this paper.

The dunning history datastore 512 functions to store dunning history data indicating a dunning history of a data. Dunning history data of a debtor stored in the dunning history datastore 512 can be updated continuously throughout a dunning process of the debtor. For example, if a debtor does not respond to a first dunning message but responds to a subsequently sent second dunning message, then the dunning history data of the debtor stored in the dunning history can be updated to indicate that the debtor responded to the second dunning message.

In an example of operation of the example system shown in FIG. 5, the dunning message datastore 504 stores dunning message data related to dunning a debtor. In the example of operation of the example system shown in FIG. 5, the communication channel interface 506 sends at least one dunning message to the debtor according to the dunning message data. Further, in the example of operation of the example system shown in FIG. 5, the event datastore 508 stores dunning event data describing actions or inactions that can be taken by a debtor in response to receiving a dunning message. In the example of operation of the example system shown in FIG. 5, the dunning history management engine 510 uses event data stored in the event data 508 and interacts with the communication channel interface 506 to generate and maintain a dunning history of the debtor, as indicated by dunning history data stored in the dunning history datastore 512.

Figure 6:
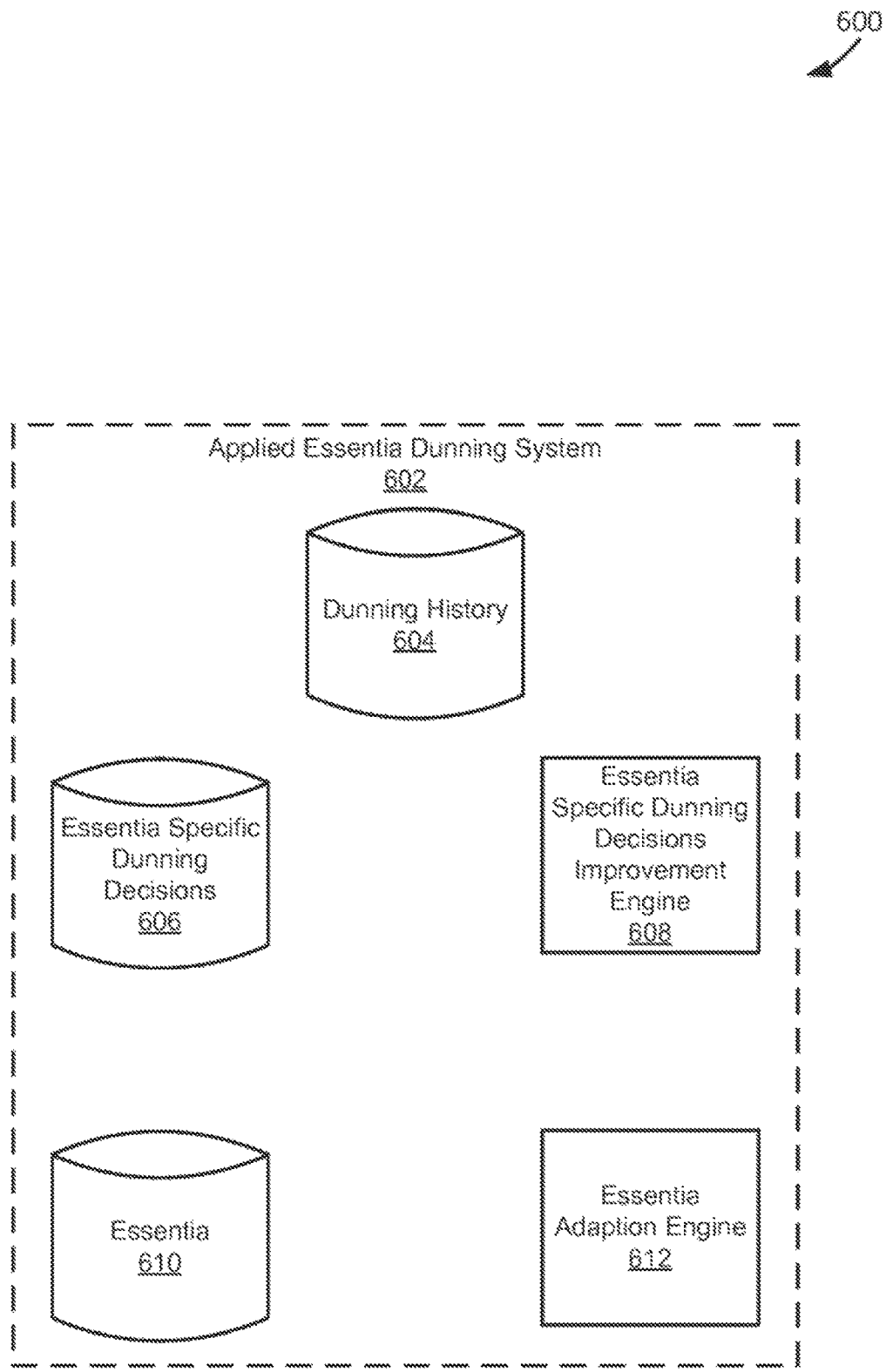
FIG. 6 depicts a diagram of an example of a system for updating essentias and essentia specific dunning decisions for dunning debtors according to applied essentias.

FIG. 6 depicts a diagram 600 of an example of a system for updating essentias and essentia specific dunning decisions for dunning debtors according to applied essentias. The example system shown in FIG. 6 includes an applied essentia dunning system 602. The applied essentia dunning system 602 functions according to an applicable system for dunning a debtor according to an essentia applied to the debtor, such as the applied essentia dunning systems described in this paper. In the example system shown in FIG. 6, the applied essentia dunning system 602 includes a dunning history datastore 604, an essentia specific dunning decisions datastore 606, an essentia specific dunning decisions improvement engine 608, an essentia datastore 610, and an essentia adaption engine 612.

The dunning history datastore 604 functions according to an applicable datastore for storing dunning history data indicating dunning histories of debtors, such as the dunning history datastores described in this paper. Dunning history data stored in the dunning history datastore 604 can include dunning messages sent to debtors and events that occurred as a result of the dunning messages being sent to the debtors.

The essentia specific dunning decisions datastore 606 functions according to an applicable datastore for storing essentia specific dunning decisions data indicating essentia specific dunning decisions. The essentia specific dunning decisions datastore 606 can store essentia specific dunning decisions data based on input received from a creditor. Depending upon implementation-specific or other considerations, the essentia specific dunning decisions datastore 606 can store essentia specific dunning decisions data that is modified over time based on favorable history in dunning debtors. For example, if a debtor mapped to a specific essentia pays in response to being contacted twice daily, then the essentia specific dunning decisions data stored in the essentia specific dunning decisions datastore 606 can be modified to indicate contacting debtors, mapped to the specific essentia, twice daily. Further depending upon implementation-specific or other considerations, essentia specific dunning decisions data stored in the essentia specific dunning decisions datastore 606 can be modified by creditors through an applicable interface, such as the creditor interfaces described in this paper. For example, a creditor can modify essentia specific dunning decisions data stored in the essentia specific dunning decisions datastore 606 to indicate offering a discount to debtors who responds to a first dunning message sent to them.

The essentia specific dunning decisions improvement engine 608 functions to modify essentia specific dunning decisions. The essentia specific dunning decisions improvement engine 608 can modify essentia dunning decisions data based on performance in dunning debtors. In modifying based on performance in dunning debtors, the essentia specific dunning decisions improvement engine 608 can modify essentia specific dunning decisions based on whether favorable dunning history or favorable events occur. For example, if a debtor mapped to a specific essentia agrees to pay a debt after being dunned according to first essentia specific dunning decisions, then the essentia specific dunning decisions improvement engine 608 can modify all specific essentia dunning decisions of the specific essentia to include the first essentia specific dunning decisions.

The essentia datastore 610 functions according to an applicable datastore for storing essentia data indicating essentia to which debtors can be mapped, such as the essentia datastores described in this paper. Essentia data stored in the essentia datastore 610 can change over time to define new essentia and/or modify currently existing essentia. Specifically, essentia data stored in the essentia datastore 610 can change to define new subsets of individuals based on changing or newly defined or discovered characteristic variables. For example if characteristic variables include males within a specific country, and new characteristic variables are discovered defining males within a first region and a second region within the country, then the essentia data stored in the essentia datastore 610 can be modified to define new essentias identifying characteristic variables of males within the first region and males within the second region.

The essentia adaption engine 612 functions to update currently existing essentias or create new essentias by modifying essentia data. Depending upon implementation-specific or other considerations, in modifying essentia data, the essentia adaption engine 612 can modify or create new characteristic variables that define and segment individuals into categories of individuals. For example, the essentia adaption engine 612 can modify a characteristic variable of an age range between 20 and 30 to include an age range between 20 and 25 and define a new characteristic variable to include an age range between 26 and 30. Further depending upon implementation-specific or other considerations, in modifying characteristic variables of individuals, the essentia adaption engine 612 can change a characteristic variable included as part of essentia defining a category of individuals and/or remove a characteristic variable from essentia defining a category of individuals. For example if an essentia is defined by characteristic variables including males between the ages of 20 and 30 associated with a specific region, then the essentia adaption engine 612 can remove the characteristic variable associated with the specific region from the essentia so that the essentia is defined as males between the ages of 20 and 30.

In a specific implementation, the essentia adaption engine 612 changes essentia data based on if favorable dunning history and/or a favorable event in the dunning history occurs. In modifying essentia data according to a favorable event or history, the essentia adaption engine 612 can modify essentia of individuals that define one or a plurality of different categories of individuals based on whether a favorable event or history occurs. For example, if a favorable history is achieved for dunning a debtor mapped to an essentia defined by a characteristic variable indicating males between 20 and 25 years old, then the essentia adaption engine 612 can broaden the characteristic variable defining the essentia to include males between 20 and 30 years old.

In a specific implementation, the essentia adaption engine 612 changes essentia data based on if unfavorable dunning history and/or an unfavorable event in the dunning history occurs. In modifying essentia of individuals according to an unfavorable event or history, the essentia adaption engine 612 can modify essentia of individuals that define one or a plurality of different categories of individuals based on whether an unfavorable event or history occurs. For example, if an unfavorable history is achieved for dunning a debtor mapped to an essentia defined by a characteristic variable indicating males between 20 and 25 years old, then the essentia adaption engine 612 can modify the characteristic variable defining the essentia to include males between 20 and 22 years old.

In an example of operation of the example system shown in FIG. 6, the dunning history datastore 604 stores dunning history data indicating a dunning history in dunning debtors. In the example of operation of the example system shown in FIG. 6, the essentia specific dunning decisions improvement engine 608 modifies essentia specific dunning decisions data stored in the essentia specific dunning decisions datastore 606 according to the dunning history data. Further, in the example of operation of the example system shown in FIG. 6, the essentia adaption engine 612 modifies essentia data stored in the essentia datastore 610 according to the dunning history data.

Figure 7:
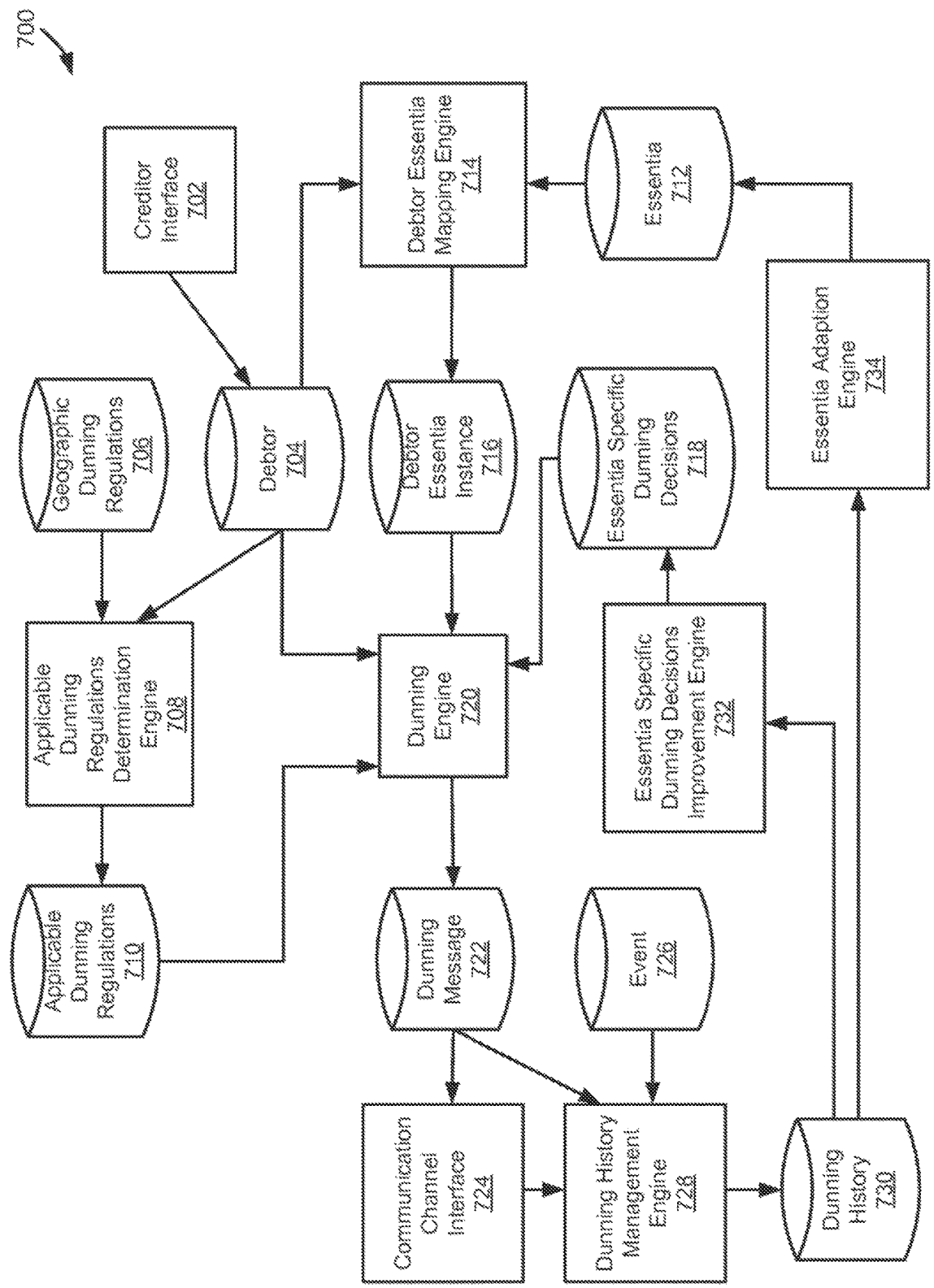
FIG. 7 depicts a diagram of an example of a system for generating dunning messages based on debtor essentia.

FIG. 7 depicts a diagram 700 of an example of a system for generating dunning messages based on debtor essentia. The example system shown in FIG. 7 includes a creditor interface 702, a debtor datastore 704, a geographic dunning regulations datastore 706, a dunning regulations determination engine 708, an applicable dunning regulations datastore 710, an essentia datastore 712, a debtor essentia mapping engine 714, a debtor essentia interface 716, an essentia specific dunning decisions datastore 718, a dunning engine 720, a dunning message datastore 722, a communication channel interface 724, an event datastore 726, a dunning history management engine 728, a dunning history datastore 730, an essentia specific dunning decisions improvement engine 732, and an essentia adaption engine 734. An applicable combination or all of the engines, interfaces, and datastores in the example system shown in FIG. 7 can be included as part of an applicable system for dunning using a debtor's essentia, such as the applied essentia dunning systems described in this paper.

The creditor interface 702 functions according to an applicable interface through which a creditor can send and receive data, such as the creditor interfaces described in this paper. The creditor interface 702 can serve as an interface through which a creditor can send debtor data. Depending upon implementation-specific or other considerations, a creditor can change essentia specific dunning decisions data through a creditor interface. For example, the creditor can change an essentia specific dunning decision for a debtor to offer the debtor a discount.

The debtor datastore 704 functions according to an applicable datastore for storing debtor data, such as the debtor datastores described in this paper. The debtor datastore 704 can store debtor data received from a creditor through the creditor interface 702. Debtor data stored in the debtor datastore 704 can include information about a debtor and transaction data of a transaction for which the debtor has become delinquent.

The geographic dunning regulations datastore 706 functions according to an applicable datastore for storing dunning regulations data, such as the dunning regulations datastores described in this paper. Depending upon implementation-specific or other considerations, geographic dunning regulations, stored in the geographic dunning regulations datastore 706 as dunning regulations data, can be received or determined from a public system that provides dunning regulations for a region. For example, dunning regulations can be determined from a system that provides access to state laws and regulations.

The applicable dunning regulations determination engine 708 functions according to an applicable engine for determining applicable dunning regulations for a debtor, such as the applicable dunning regulations determination engines described in this paper. The applicable dunning regulations determination engine 708 can determine applicable dunning regulations for a debtor based on dunning regulations data stored in the geographic dunning regulations datastore 706 and debtor data stored in the debtor datastore 704. Depending upon implementation-specific or other considerations, the applicable dunning regulations determination engine 708 can determine applicable dunning regulations for a debtor based on a geographic region associated with a debtor, as is included as part of debtor data. For example, the applicable dunning regulations determination engine 708 can determine a region in which a debtor lives from debtor data, and determine dunning regulations for the region from dunning regulations data stored in the geographic dunning regulations datastore 706.

The applicable dunning regulations datastore 710 functions according to an applicable datastore for storing applicable dunning regulations data, such as the applicable dunning regulations datastores described in this paper. Applicable dunning regulations data, indicating dunning regulations applicable to a debtor and stored in the applicable dunning regulations datastore 710, can be generated by the dunning regulations determination engine 708.

The essentia datastore 712 functions according to an applicable datastore for storing essentia data, such as the essentia datastores described in this paper. Essentia of individuals, included as essentia data stored in the essentia datastore 712, can define categories of individuals to which debtors can be mapped according to characteristic variables of the debtors. For example, if a debtor is a 26 year old male who lives in a specific region, then the debtor can be mapped to a category of individuals who are males within the ages of 20 to 30 who live in the specific region. Depending upon implementation-specific or other considerations, an applicable number of different essentia of individuals creating an applicable number of categories of individuals can be defined and/or changed over time to modify existing categories of individuals and/or create new categories of individuals. Further depending upon implementation-specific or other considerations, essentia of individuals can be defined and changed through manual input by an operator. Depending upon implementation-specific or other considerations, essentia of individuals can be defined and changed over time in response to actions taken by debtors as a result of dunning messages generated, at least in part, according to essentia to which the debtors are mapped.

The debtor essentia mapping engine 714 functions according to an applicable engine for mapping debtors to an essentia, such as the debtor essentia mapping engines described in this paper. In mapping debtors to a category of individuals, the debtor essentia mapping engine 714 can map a debtor to a category of individuals based on essentia of individuals defining the category of individuals and essentia of the debtor. In mapping a debtor to a category of individuals based on essentia, the debtor essentia mapping engine 714 can use debtor data stored in the debtor data datastore 704 and essentia data stored in the essentia datastore 712. Depending upon implementation-specific or other considerations, a debtor can adopt one or a plurality of character variables included as part of an essentia defining a category of individuals the debtor is mapped to even if the essentia of the debtor does not include the one or the plurality of character variables. For example, if essentia for a debtor describes the debtor as a male who is 27 years old and lives in a specific region and the debtor essentia mapping engine 714 can map the debtor to a category of individuals defined by essentia describing males who are 27 years old and live in the specific region who are employed, then the debtor can adopt the characteristic variable of being employed.

In a specific implementation, the debtor essentia mapping engine 714 maps debtors to a category of individuals if a threshold number of characteristic variables of the debtor match characteristic variables defining the category of individuals. For example, if a threshold to map a debtor to a category of individuals is four, and the debtor essentia mapping engine 714 finds that the debtor has six characteristic variables that match characteristic variables of the category of individuals, then the debtor essentia mapping engine 714 can map the debtor to the category of individuals.

In a specific implementation, the debtor essentia mapping engine 714 maps a debtor to a category of individuals based on related characteristic variables of the category of individuals and the debtor. For example, if essentia of the debtor indicate that the debtor is employed as a doctor but does not indicate what kind of doctor the debtor is, then the debtor essentia mapping engine 714 can map the debtor to a category of individuals defined by essentia that include dermatologists.

The debtor essentia instance datastore 716 functions according to an applicable datastore for storing essentia instance data, such as the essentia instance datastore described in this paper. The debtor essentia instance datastore 716 can store essentia instance data indicating essentia of a category of individual to which the debtor essentia mapping engine 714 maps a debtor. For example, the debtor essentia instance datastore 716 can store essentia instance data indicating characteristic variables of individuals in the category of individuals to which the debtor is mapped.

The essentia specific dunning decisions datastore 718 functions according to an applicable datastore for storing essentia specific dunning decisions data, such as the essentia specific dunning decisions datastores described in this paper. Dunning decisions to make based on an essentia instance of a debtor can be uniquely specific to different essentia and/or different categories of individuals defined by essentia. For example, an essentia for a 27 year old male who lives in a specific state can have corresponding dunning decisions specifying to send a dunning message at 8:00 in the morning while an essentia for a 27 year old male who lives in a different state can have corresponding dunning decisions specifying to send a dunning message at 3:00 in the afternoon.

The dunning engine 720 functions according to an applicable engine for managing dunning of a debtor, such as the dunning engines described in this paper. In managing dunning of a debtor, the dunning engine can generate a dunning message for the debtor. A dunning message for a debtor, generated by the dunning engine 720, can include an actual dunning message, including content to send to the debtor, and sending instructions for directing the message to the debtor. Sending instructions for a dunning message can include an address to send a dunning message to, a time to send the dunning message, and a communication channel to send the dunning message through.

In a specific implementation, the dunning engine 720 generates a dunning message for a debtor according to an essentia instance of the debtor. In generating a dunning message for a debtor according to an essentia instance of the debtor, the dunning engine 720 can use essentia instance data for a debtor stored in the debtor essentia instance datastore 716 and dunning decision data stored in the essentia specific dunning decisions datastore 718. Depending upon implementation-specific or other considerations, the dunning engine 720 can create a dunning message to include content according to essentia specific dunning decisions for essentia of a category of individuals to which a debtor is mapped. Further depending upon implementation-specific or other considerations, the dunning engine 720 can create a dunning message including sending instructions for directing the message to a debtor according to essentia specific dunning decisions for essentia of a category of individuals to which the debtor is mapped. For example, if essentia specific dunning decisions of a category of individuals to which a debtor has been mapped, included as part of essentia specific dunning decisions data 718, specifies to send a message at 8:00 in the morning, then the dunning engine 720 can create a dunning message that specifies to send a dunning message at 8:00.

In a specific implementation, the dunning engine 720 creates a dunning message according to applicable dunning regulations for a debtor, indicated by applicable dunning regulations data. Depending upon implementation-specific or other considerations, the dunning engine can create a dunning message according to dunning regulations data stored in the applicable dunning regulations datastore 710. For example, if applicable dunning regulations for the debtor specify that a dunning message must include content specifying the message is being sent by a collection agency, then the dunning engine 720 can create a dunning message that specifies that the message is being sent by a collection agency. Further depending upon implementation-specific or other considerations, the dunning engine 720 can create a dunning message including sending instructions, according to applicable dunning regulations for the debtor. For example, if applicable dunning regulations for the debtor specify that a dunning message has to be sent between 12:00 and 4:00 in the afternoon, then the dunning engine 720 can create a dunning message with sending instructions specifying to direct the dunning message only between the hours of 12:00 and 4:00 in the afternoon. Depending upon implementation-specific or other considerations, the dunning engine 720 can generate a dunning message, created in based on an essentia instance of a debtor and dunning decisions to make based on the essentia instance of the debtor, in accordance with applicable dunning regulations for the debtor.

The dunning message datastore 722 functions according to an applicable datastore for storing dunning message data, such as the dunning message datastores described in this paper. The dunning message datastore 722 can store dunning message data for dunning messages generated by the dunning engine 720. Dunning message data can include content of a dunning message generated by the dunning engine 720 for a debtor. Dunning message data can also include sending instructions for a dunning message generated by the dunning engine 720 for a debtor.

The communication channel interface 724 functions according to an applicable interface for transmitting a dunning message to a debtor across an applicable communication channel, such as the communication channel interfaces described in this paper. The communication channel interface 724 can send a dunning message generated by the dunning engine 720 as indicated by dunning message data stored in the dunning message datastore 722. Depending upon implementation-specific or other considerations, the communication channel interface 724 can send content of a dunning message, included as dunning message data for the dunning message stored in the dunning message datastore 722, according to sending instructions for the dunning message, included as dunning message data for the dunning message stored in the dunning message datastore 722. For example, if sending instructions for a dunning message indicate that the dunning message is to be transmitted to the debtor at 4:00 in the afternoon, then the communication channel interface 724 can send the dunning message at 4:00 in the afternoon. Further depending upon implementation-specific or other considerations, the communication channel interface 724 can transmit a dunning message to a debtor across a communication channel indicated by sending instructions for the dunning message, included as part of dunning message data for the dunning message. For example, if sending instructions for a dunning message indicate that the dunning message is to be sent to a debtor over a facsimile communication channel, then the communication channel interface 724 can transmit the dunning message to the debtor over the facsimile communication channel.

The event datastore 726 functions according to an applicable datastore for storing dunning event data indicating events that can occur in response to sending a dunning message to a debtor, such as the event datastores described in this paper. Events that can occur in response to sending a dunning message to a debtor including actions and/or inactions that can be taken by the debtor in response to the sending of the dunning message to the debtor. Dunning event data stored in the event datastore 726 can also include parameters that once met indicate an occurrence of a specific event in response to sending a dunning message to a debtor. For example, event data can include a parameter specifying if a response is not received from a debtor 24 hours after sending of a dunning message to the debtor, then the debtor has ignored the dunning message.

The dunning history management engine 728 functions according to an applicable engine for determining and/or managing a dunning history of a debtor, such as the dunning history management engines described in this paper. Depending upon implementation-specific or other considerations, a dunning history of a debtor can comprise a dunning message, including an identification or content of the dunning message and sending instructions under which the dunning message was transmitted to the debtor, and actions and/or inactions taken by the debtor in response to transmission of the dunning message to the debtor. For example, a dunning history of a debtor can include what dunning message was sent to a debtor, when the dunning message was sent to the debtor, and whether the dunning message was viewed by the debtor. Further depending upon implementation-specific or other considerations, a dunning history can indicate whether a dunning message was successfully transmitted to a debtor.

In a specific implementation, the dunning history management engine 728 determines events occurring in response to sending a dunning message to a debtor. In determining events occurring in response to sending a dunning message to a debtor, the dunning history management engine 728 can monitor the communication channel interface 724. Depending upon implementation-specific or other considerations, in monitoring the communication channel interface 724, the dunning history management engine 728 can determine whether a response is received from a debtor in response to a sent dunning message and/or receive the response received from the debtor. For example, the dunning history management engine 728 can determine whether a response is received from a debtor and determine an action that the debtor is willing to undertake. Further depending upon implementation-specific or other considerations, in monitoring the communication channel interface 724, the dunning history management engine 728 can determine whether a dunning message was successfully transmitted to a debtor and how the debtor interacted with the dunning message. For example, the dunning history management engine 728 can determine whether a debtor opened a dunning message or simply ignored the dunning message.

In a specific implementation, in determining events occurring in response to sending a dunning message to a debtor, the dunning history management engine 728 uses event data and dunning message data. For example, if event data indicates if a debtor does not respond to a dunning message within 24 hours of sending of the dubbing message then the debtor has failed to respond to the dunning message, and dunning message data indicates that the dunning message was sent 24 hours ago, then the dubbing history management engine 728 can determine that the debtor has failed to respond to the dunning message. In using dunning event data and dunning message data to determine a response made by a debtor in response to a dunning message, the dunning history management engine 728 can use dunning message data stored in the dubbing message datastore 722 and dunning event data stored in the event datastore 726.

In a specific implementation, the dunning history management engine 728 generates or updates dunning history data indicating a dunning history. Dunning history data generated by the dunning history management engine 728 can include applicable data related to a dunning history generated and/or maintained by the dunning history management engine 728. Depending upon implementation-specific or other considerations, dunning history data, generated by the dunning history management engine 728, can include a dunning message, including an identification or content of the dunning message and/or sending instructions under which the dunning message was transmitted to the debtor, and actions and/or inactions taken by the debtor in response to transmission of the dunning message to the debtor.

The dunning history datastore 730 functions according to an applicable datastore for storing dunning history data indicating a dunning history for a debtor, such as the dunning history datastores described in this paper. Dunning history data stored in the dunning history datastore 730 can be generated by the dunning history management engine 728. Depending upon implementation-specific or other considerations, dunning history data stored in the dunning history datastore 730. Depending upon implementation-specific or other considerations, dunning history data, stored in the dunning history datastore 730, can include a dunning message, including an identification or content of the dunning message and/or sending instructions under which the dunning message was transmitted to the debtor, and actions and/or inactions taken by the debtor in response to transmission of the dunning message to the debtor.

The essentia specific dunning decisions improvement engine 732 functions according to an applicable engine for improving essentia specific decisions based on a dunning history for a debtor, such as the essentia specific dunning decisions improvements engines described in this paper. In improving essentia specific dunning decisions based on a dunning history for a debtor, the essentia specific dunning decisions improvement engine 732 can modify essentia specific dunning decisions, included as part of essentia specific dunning decisions data stored in the essentia specific dunning decisions datastore 718. The essentia specific dunning decisions improvement engine 732 can modify essentia specific dunning decisions for essentia of an essentia instance of a debtor based on a dunning history for the debtor.

In a specific implementation, the essentia specific dunning decisions improvement engine 732 modifies essentia specific dunning decisions for essentia of an essentia instance of a debtor if favorable dunning history and/or a favorable event in the dunning history occurs. A favorable event or history can include a history or an event that advances a debtor towards resolutions of a debt. For example, a favorable event can include a debtor agreeing to partial payment of a debt. In modifying essentia specific dunning decisions for an essentia instance of a debtor according to a favorable event or history, the essentia specific dunning decisions improvement engine 732 can modify the dunning decisions to instruct generation and sending of dunning messages that led to the favorable event or history for the essentia of the essentia instance of the debtor.

In a specific implementation, the essentia specific dunning decisions improvement engine 732 modifies essentia specific dunning decisions for essentia of an essentia instance of a debtor if unfavorable dunning history and/or an unfavorable event in the dunning history occurs. An unfavorable event or history can include a history or an event that pushes a debtor away from resolution of a debt. For example, an unfavorable event can include a debtor ignoring a dunning message. In modifying essentia specific dunning decisions for an essentia instance of a debtor according to an unfavorable event or history, the essentia specific dunning decisions improvement engine 732 can modify the dunning decisions to restrict generation and sending of dunning messages that led to the unfavorable event or history for the essentia of the essentia instance of the debtor.

The essentia adaption engine 734 functions according to an applicable engine for modifying essentia data based on a dunning history for a debtor, such as the essentia adaption engines described in this paper. In modifying essentia of individuals based on a dunning history for a debtor, the essentia adaption engine 734 can change essentia of individuals, included as part of essentia data stored in the essentia datastore 712.

In a specific implementation, in modifying essentia data based on a dunning history for a debtor, the essentia adaption engine 734 modifies characteristic variables that define and segment individuals into categories of individuals. Depending upon implementation-specific or other considerations, in modifying essentia data, the essentia adaption engine 734 can change a characteristic variable included as part of essentia defining a category of individuals and/or remove a characteristic variable from essentia defining a category of individuals. The essentia adaption engine 734 can modify characteristic variables.

In a specific implementation, the essentia adaption engine 734 modifies essentia data if favorable dunning history and/or a favorable event in the dunning history occurs. In modifying essentia data according to a favorable event or history, the essentia adaption engine 734 can modify essentia of individuals that define one or a plurality of different categories of individuals based on whether a favorable event or history occurs. For example, if a favorable history occurs for dunning a debtor mapped to a specific essentia of individuals, then the essentia adaption engine 734 can broaden characteristic variables defining the essentia of individuals. In one example, if a favorable history is achieved for dunning a debtor mapped to an essentia of individuals defined by a characteristic variable indicating males between 20 and 25 years old, then the essentia adaption engine 734 can broaden the characteristic variable to include males between 20 and 30 years old.

In a specific implementation, the essentia adaption engine 734 modifies essentia data if unfavorable dunning history and/or an unfavorable event in the dunning history occurs. In modifying essentia data according to an unfavorable event or history, the essentia adaption engine 734 can modify essentia of individuals that define one or a plurality of different categories of individuals based on whether an unfavorable event or history occurs. For example, if an unfavorable history occurs for dunning a debtor mapped to a specific essentia of individuals, then the essentia adaption engine 734 can restrict characteristic variables defining the essentia of individuals. In one example, if an unfavorable history is achieved for dunning a debtor mapped to an essentia of individuals defined by a characteristic variable indicating males between 20 and 25 years old, then the essentia adaption engine 734 can restrict the characteristic variable to include males between 20 and 22 years old.

In an example of operation of the example system shown in FIG. 7, the creditor interface 702 receives debtor data, for a debtor, from a creditor. In the example of operation of the example system shown in FIG. 7, the debtor datastore 704 stores debtor data received through the creditor interface 702 from the creditor. Further, in the example of operation of the example system shown in FIG. 7, the geographic dunning regulations datastore 706 stores dunning regulations data indicating dunning regulations for geographic regions. In the example of operation of the example system shown in FIG. 7, the applicable dunning regulations determination engine 708 determines dunning regulations applicable to the debtor based on the debtor data and dunning regulations for geographic regions. Additionally, in the example of operation of the example system shown in FIG. 7, the applicable dunning regulations datastore 710 stores applicable dunning regulations data indicating the dunning regulations applicable to the debtor.

In the example of operation of the example system shown in FIG. 7, the essentia datastore 712 stores essentia data indicating essentia of individuals defining categories of individuals. Further, in the example of operation of the example system shown in FIG. 7, the debtor essentia mapping engine 714 maps the debtor to a category of individuals based on essentia of individuals defining the category of individuals, included as part of essentia data stored in the essentia datastore 712, and essentia of the debtor, included as part of debtor data stored in the debtor datastore 704. In the example of operation of the example system shown in FIG. 7, the debtor essentia instance datastore 716 stores essentia instance data indicating an essentia instance of the debtor.

In the example of operation of the example system shown in FIG. 7, the essentia specific dunning decisions datastore 718 stores essentia specific dunning decisions data indicating dunning decisions to make based on the essentia instance of the debtor. Further, in the example of operation of the example system shown in FIG. 7, the dunning engine 720 generates a dunning message to send to the debtor according to the applicable dunning regulations for the debtor, the essentia instance of the debtor, and the dunning decisions to make based on the essentia instance of the debtor. In the example of operation of the example system shown in FIG. 7, the communication channel interface 724 transmits the dunning message generated by the dunning engine 720 according to sending instructions included as part of the dunning message.

In the example of operation of the example system shown in FIG. 7, the event datastore 726 stores dunning event data indicating events that can occur in response to sending a dunning message to a debtor. Further, in the example of operation of the example system shown in FIG. 7, the dunning history management engine 728 generates and/or manages a dunning history of the debtor according to the transmission of the dunning message to the debtor. In the example of operation of the example system shown in FIG. 7, the dunning history datastore 730 stores dunning history data indicating the dunning history of the debtor. Additionally, in the example of operation of the example system shown in FIG. 7, the essentia specific dunning decisions improvement engine 732 improves essentia specific decisions based on a dunning history for a debtor by modifying the essentia specific dunning decisions data stored in the essentia specific dunning decisions datastore 718. In the example of operation of the example system shown in FIG. 7, the essentia adaption engine 734 modifies essentia of individuals based on a dunning history for a debtor by changing the essentia data stored in the essentia datastore 712.

Figure 8A:
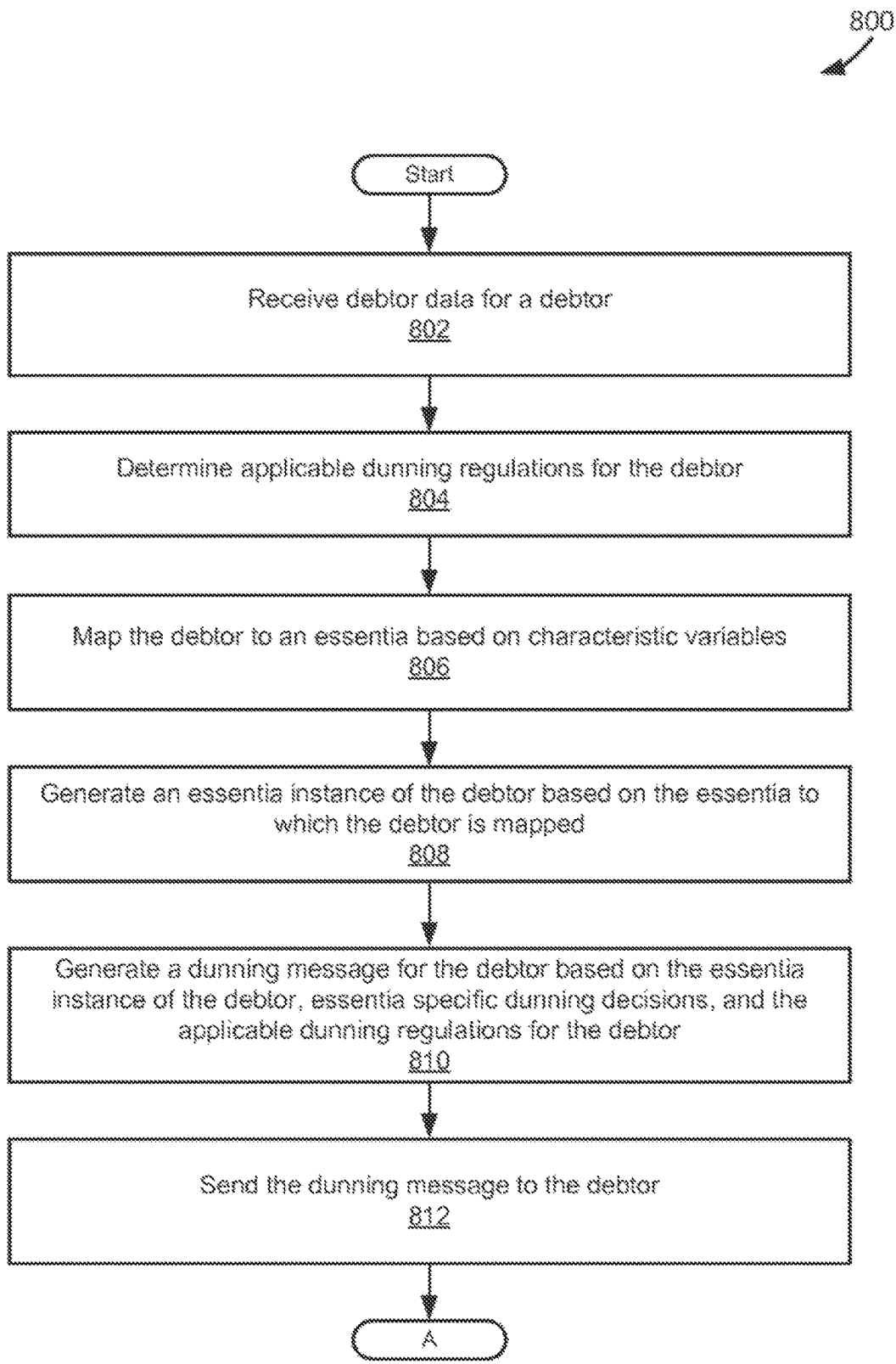
FIGS. 8A and 8B depict a flowchart of an example of a method for dunning a debtor using applied essentia.
Figure 8B:
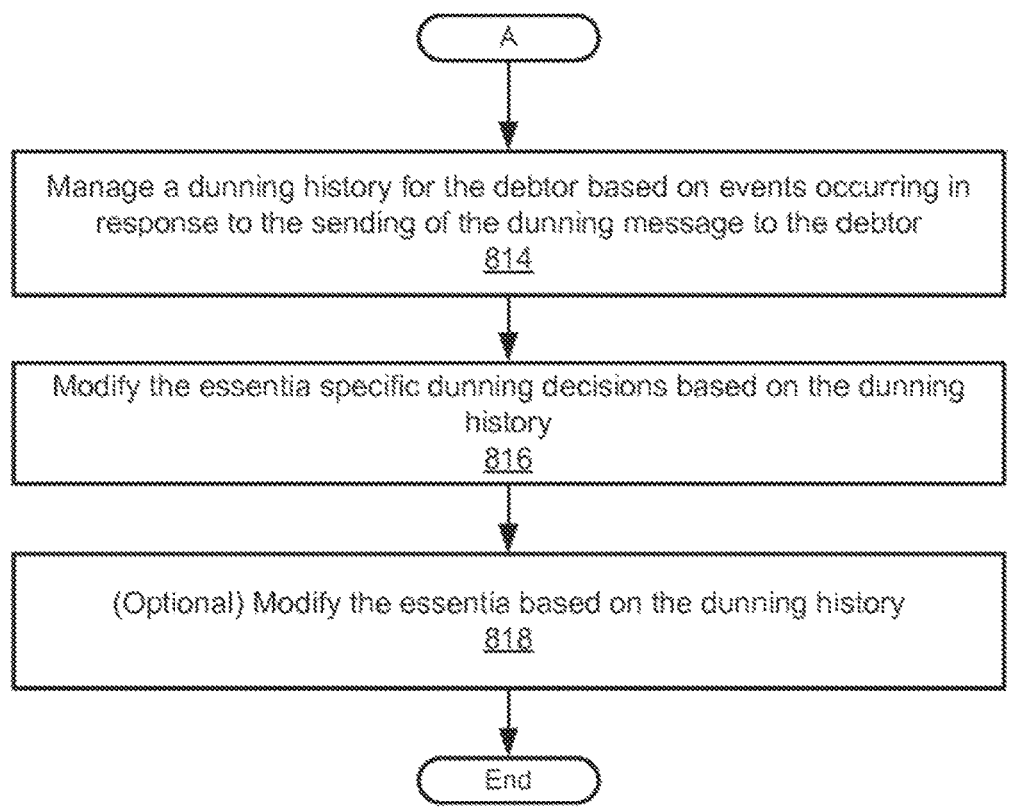

FIGS. 8A and 8B depict a flowchart 800 of an example of a method for dunning a debtor using applied essentia. The flowchart 800 begins at module 802, where debtor data for the debtor is received. Debtor data can be received from a creditor through an applicable interface through which a creditor can send and/or receive data. Debtor data can include data describing a debtor and a transaction to which a debtor has become delinquent. Depending upon implementation-specific or other considerations, debtor data can include geographic, demographic, psychographic, and/or behavioralistic data of a debtor used, at least in part, to map a debtor to a category of individuals.

The flowchart 800 continues to module 804, where applicable dunning regulations for the debtor are determined. Applicable dunning regulations for a debtor can be determined at module 804 using an applicable engine for determining an applicable dunning regulation for a debtor, such as the applicable dunning regulations determination engines described in this paper. Applicable dunning regulations for a debtor can be determined based on geographic dunning regulations and debtor data for the debtor. For example, a geographic region associated with a debtor can be determined using debtor data for the debtor, and applicable dunning regulations for the debtor can be determined from geographic dunning regulations based on the geographic region associated with the debtor.

The flowchart 800 continues to module 806, where the debtor is mapped to an essentia based on characteristic variables of the debtor and characteristic variables defining the essentia. An applicable engine can map a debtor to an essentia based on characteristic variables, such as the debtor essentia mapping engines described in this paper. Depending upon implementation-specific or other considerations, a debtor can be mapped to an essentia if a threshold number of characteristic variables of the debtor match characteristic variables defining the category of individuals. Further depending upon implementation-specific or other considerations, a debtor can be mapped to an essentia based on related characteristic variables of the category of individuals and the debtor.

The flowchart 800 continues to module 808, where an essentia instance of the debtor is generated based on the essentia to which the debtor is mapped. An applicable engine can generate an instance of a debtor based on an essentia to which the debtor is mapped, such as the debtor essentia mapping engines described in this paper. An essentia instance of a debtor can indicate characteristic variables that define an essentia to which the debtor has been mapped.

The flowchart 800 continues to module 810, where a dunning message is generated for the debtor based on the essentia instance of the debtor, essentia specific dunning decisions for the debtor, and the applicable dunning regulations for the debtor. An applicable engine can generate a dunning message for a debtor, such as the dunning engines described in this paper. Essentia specific dunning decisions can include dunning decisions to make based on an essentia instance of a debtor, including characteristic variables of a category of individuals to which the debtor is mapped. A dunning message generated at module 810 can include content to transmit to a debtor and sending instructions for transmitting the dunning message to the debtor. At module 810, dunning decisions can be used in generating a dunning message based on characteristic variable defining a category of individuals to which a debtor is mapped.

The flowchart 800 continues to module 812, where the dunning message is sent to the debtor. A dunning message can be sent to a debtor through an applicable interface for sending a dunning message to a debtor, such as the communication channel interfaces described in this paper. A dunning message can be sent to a debtor according to sending instructions for a dunning message. A dunning message can be sent over a specific communication channel indicated by sending instructions for a dunning message.

The flowchart 800 continues to module 814, where a dunning history for the debtor is managed based on events occurring in response to the sending of the dunning message to the debtor. In managing a dunning history, a dunning history can be generated and/or updated. Events occurring in response to sending a dunning message to a debtor can be monitored and/or determined in order to manage a dunning history of the debtor.

The flowchart 800 continues to module 816, where the essentia specific dunning decisions are modified based on the dunning history. Essentia specific dunning decisions can be modified by an applicable engine for modifying essentia specific dunning decisions based on dunning history, such as the essentia specific dunning decisions improvement engines described in this paper. Depending upon implementation-specific or other considerations, essentia specific dunning decisions can be modified if favorable dunning history and/or a favorable event in the dunning history occurs of a debtor mapped to a category of individual defined by the essentia. Further depending upon implementation-specific or other considerations, essentia specific dunning decisions can be modified if unfavorable dunning history and/or an unfavorable event in the dunning history occurs of a debtor mapped to a category of individual defined by the essentia.

The flowchart 800 optionally continues to module 818, where the essentia is modified based on the dunning history. The essentia can be modified by an applicable engine for modifying essentia of individuals based on dunning history, such as the essentia adaption engines described in this paper. Depending upon implementation-specific or other considerations, the essentia can be modified if favorable dunning history and/or a favorable event in the dunning history occurs of a debtor mapped to a category of individual defined by the essentia. Further depending upon implementation-specific or other considerations, the essentia can be modified if unfavorable dunning history and/or an unfavorable event in the dunning history occurs of a debtor mapped to a category of individual defined by the essentia.

Figure 9:
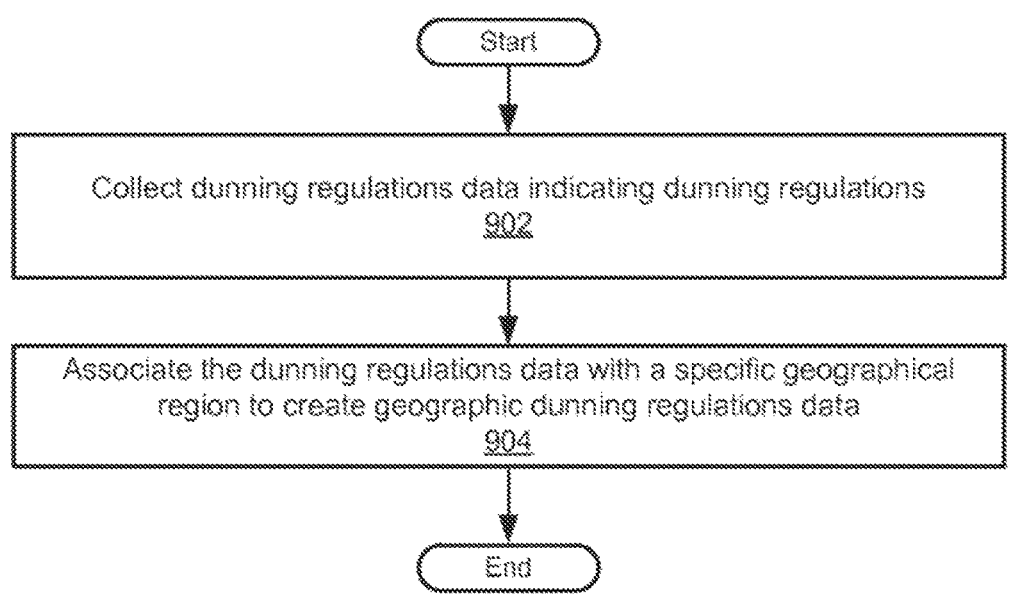
FIG. 9 depicts a flowchart of an example of a method for collecting geographic dunning regulations for dunning a debtor associated with a specific geographical region.

FIG. 9 depicts a flowchart 900 of an example of a method for collecting geographic dunning regulations for dunning a debtor associated with a specific geographical region. The flowchart 900 begins at module 902, where dunning regulations data indicating dunning regulations to apply when dunning debtors is collected. An applicable engine for collecting dunning regulations data, such as the dunning regulations retrieval engines described in this paper, can function to collect dunning regulations data. Dunning regulations data can be collected from an applicable system for providing dunning regulations data, such as the dunning regulations provider systems described in this paper. A dunning regulations provider system can be a system that can be accessed by the public. Depending upon implementation-specific or other considerations, a dunning regulations provider system can be specific to a geographical region. For example, a dunning regulations provider system can be a system that provides access to laws and regulations within a specific county.

The flowchart 900 continues to module 904, where the dunning regulations data is associated with a specific geographical region to create geographic dunning regulations data. An applicable engine for associating dunning regulations data with a specific geographical region, such as the dunning regulations management engines described in this paper, can function to associate the dunning regulations data with a specific geographical region to create geographic dunning regulations data. Depending upon implementation-specific or other considerations, dunning regulations data indicating dunning regulations within a specific geographical region can be grouped together and associated with the specific geographical region to create geographic dunning regulations data.

Figure 10:
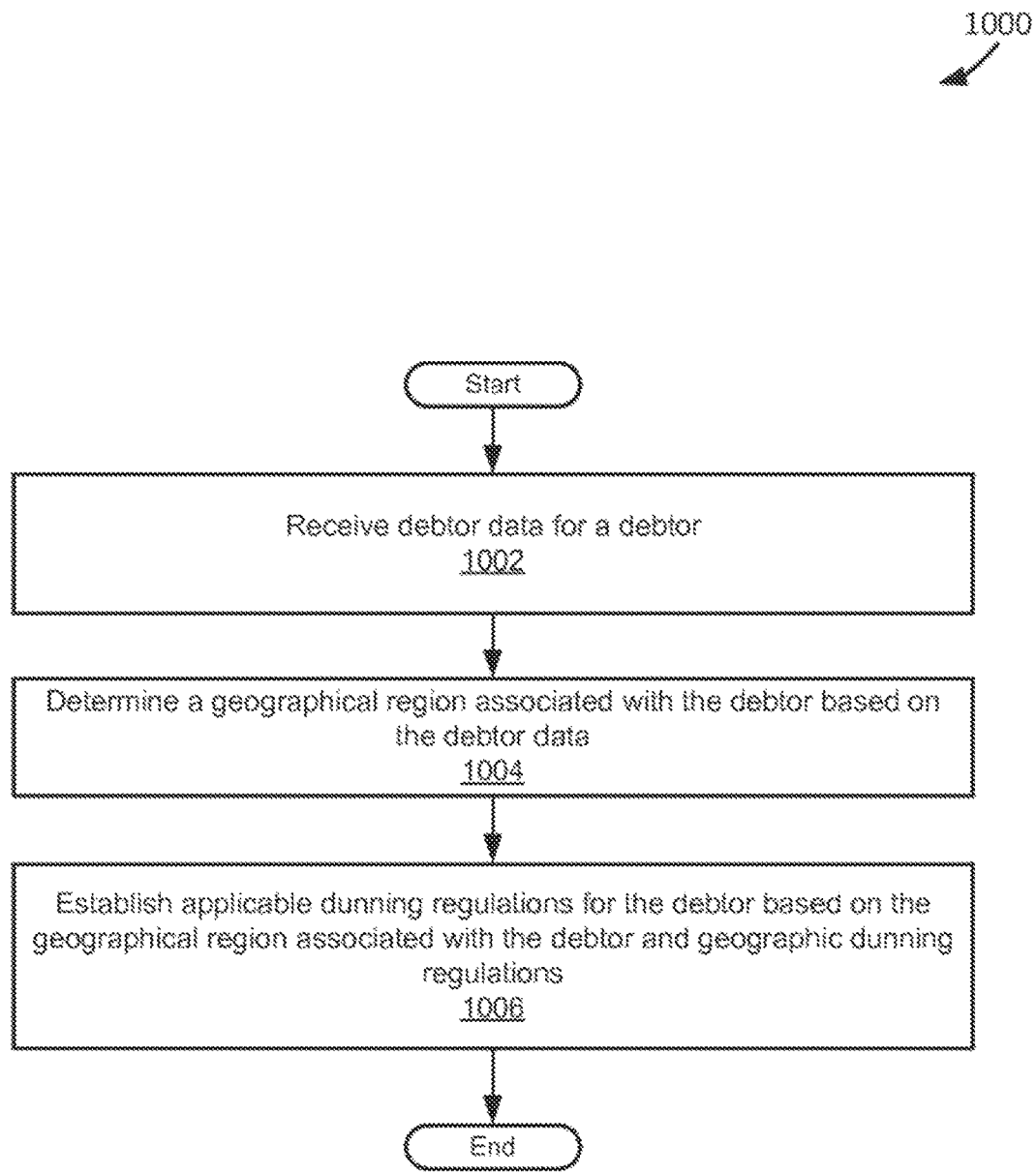
FIG. 10 depicts a flowchart of an example of a method for establishing applicable dunning regulations to apply to a debtor in dunning the debtor.

FIG. 10 depicts a flowchart 1000 of an example of a method for establishing applicable dunning regulations to apply to a debtor in dunning the debtor. The flowchart 1000 begins at module 1002 where debtor data for a debtor is received. Debtor data can be received from a creditor to which a debtor owes consideration. Debtor data can be received through an applicable interface for sending and receiving data from a creditor, such as the creditor interfaces described in this paper.

The flowchart 1000 continues to module 1004, where a geographical region associated with the debtor is determined based on the debtor data. An applicable engine for determining a geographical region associated with a debtor, such as the applicable dunning regulations determination engines described in this paper, can determine a geographical region associated with the debtor from the debtor data. Depending upon implementation-specific or other considerations, a geographic region associated with the debtor can include a region where the debtor resides and/or a region where the debtor is registered.

The flowchart 1000 continues to module 1006, where applicable dunning regulations for the debtor are determined based on the geographical region associated with the debtor and geographic dunning regulations data. An applicable engine for determining applicable dunning regulations, such as the applicable dunning regulations determination engines described in this paper, can determine applicable dunning regulations for the debtor based on the geographical region associated with the debtor. Specifically, geographic dunning regulations data can be parsed to retrieve all or a portion of dunning regulations for the geographical region associated with the debtor to determine applicable dunning regulations to apply when dunning the debtor.

Figure 11:
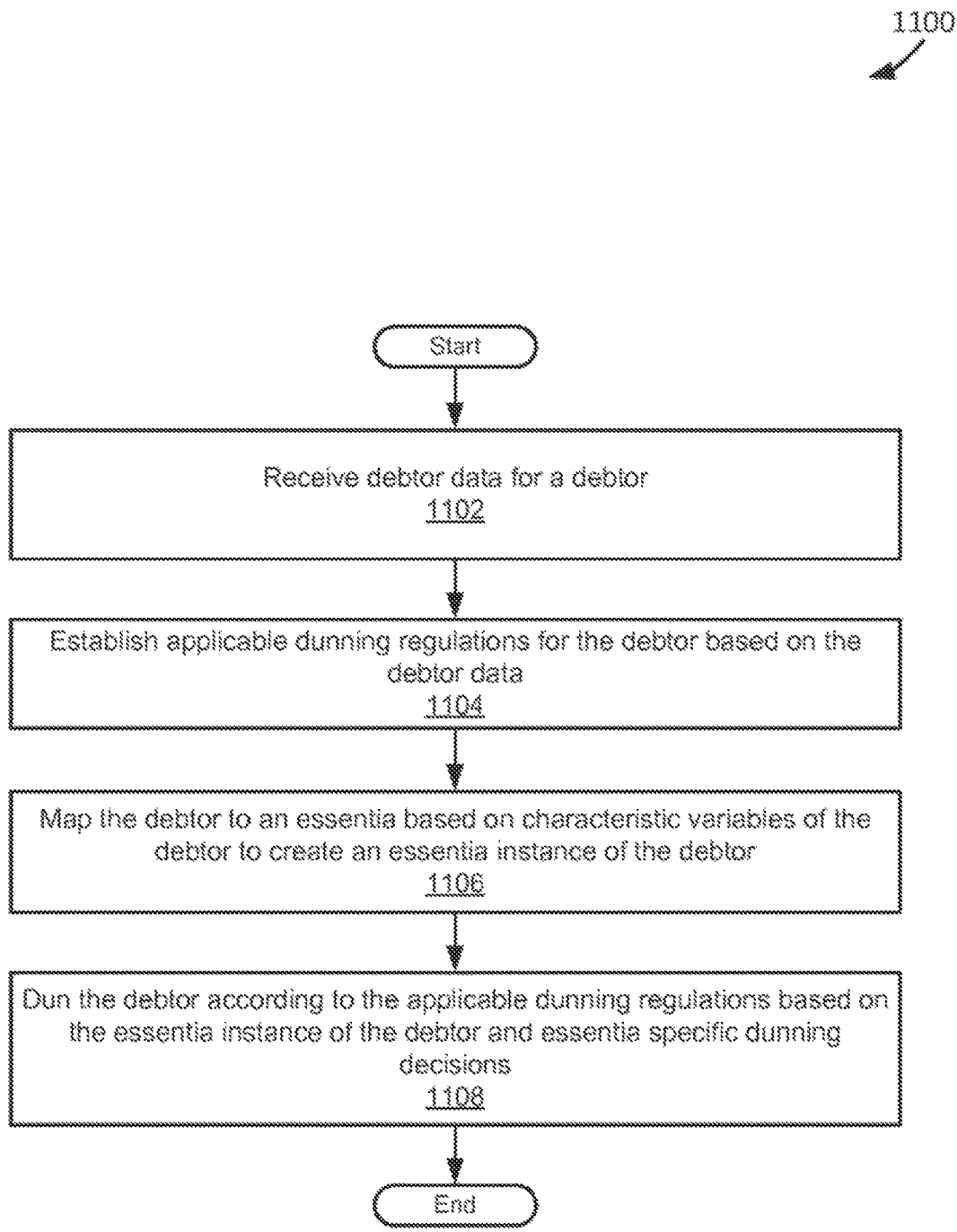
FIG. 11 depicts a flowchart of an example of a method for dunning a debtor based on an essentia to which the debtor is mapped.

FIG. 11 depicts a flowchart 1100 of an example of a method for dunning a debtor based on an essentia to which the debtor is mapped. The flowchart begins at module 1102, where debtor data for a debtor is received. Debtor data can be received from a creditor to which a debtor owes consideration. Debtor data can be received through an applicable interface for sending and receiving data from a creditor, such as the creditor interfaces described in this paper.

The flowchart 1100 continues to module 1104, where applicable dunning regulations for the debtor are determined based on the debtor data. An applicable engine for determining applicable dunning regulations, such as the applicable dunning regulations determination engines described in this paper, can determine applicable dunning regulations for the debtor based debtor data. Applicable dunning regulations can be determined based on a geographical region associated with the debtor and geographic dunning regulations. Specifically, geographic dunning regulations data can be parsed to retrieve all or a portion of dunning regulations for the geographical region associated with the debtor to determine applicable dunning regulations to apply when dunning the debtor.

The flowchart 1100 continues to module 1106, where the debtor is mapped to an essentia based on characteristics variables of the debtor to create an essentia instance of the debtor. An applicable engine for mapping a debtor to an essentia, such as the debtor essentia mapping engines described in this paper, can map the debtor to an essentia based on characteristic variables of the debtor. Characteristics variable of the debtor used to map the debtor to an essentia can be determined, at least in part, from the debtor data. Depending upon implementation-specific or other considerations, the debtor can be mapped to an essentia based on whether characteristic variable of the debtor match or are related to characteristic variable of an essentia of a group of individuals.

The flowchart 1100 continues to module 1108 where the debtor is dunned according to the applicable dunning regulations and essentia specific dunning decisions corresponding to the essentia instance. An applicable engine for dunning a debtor, such as the dunning engines described in this paper, can function to dun the debtor according to the applicable dunning regulations and essentia specific dunning decisions corresponding to the essentia instance of the debtor. In dunning the debtor, dunning messages and sending instructions for the dunning messages can be generated according to essentia specific dunning decisions corresponding to the essentia instance of the debtor. Depending upon implementation-specific or other considerations, the debtor can be dunned using, at least in part, the debtor data. For example, debtor data can indicate a preferred communication channel for communicating with the debtor, and dunning messages can be sent to the debtor over the preferred communication channel.

Figure 12:
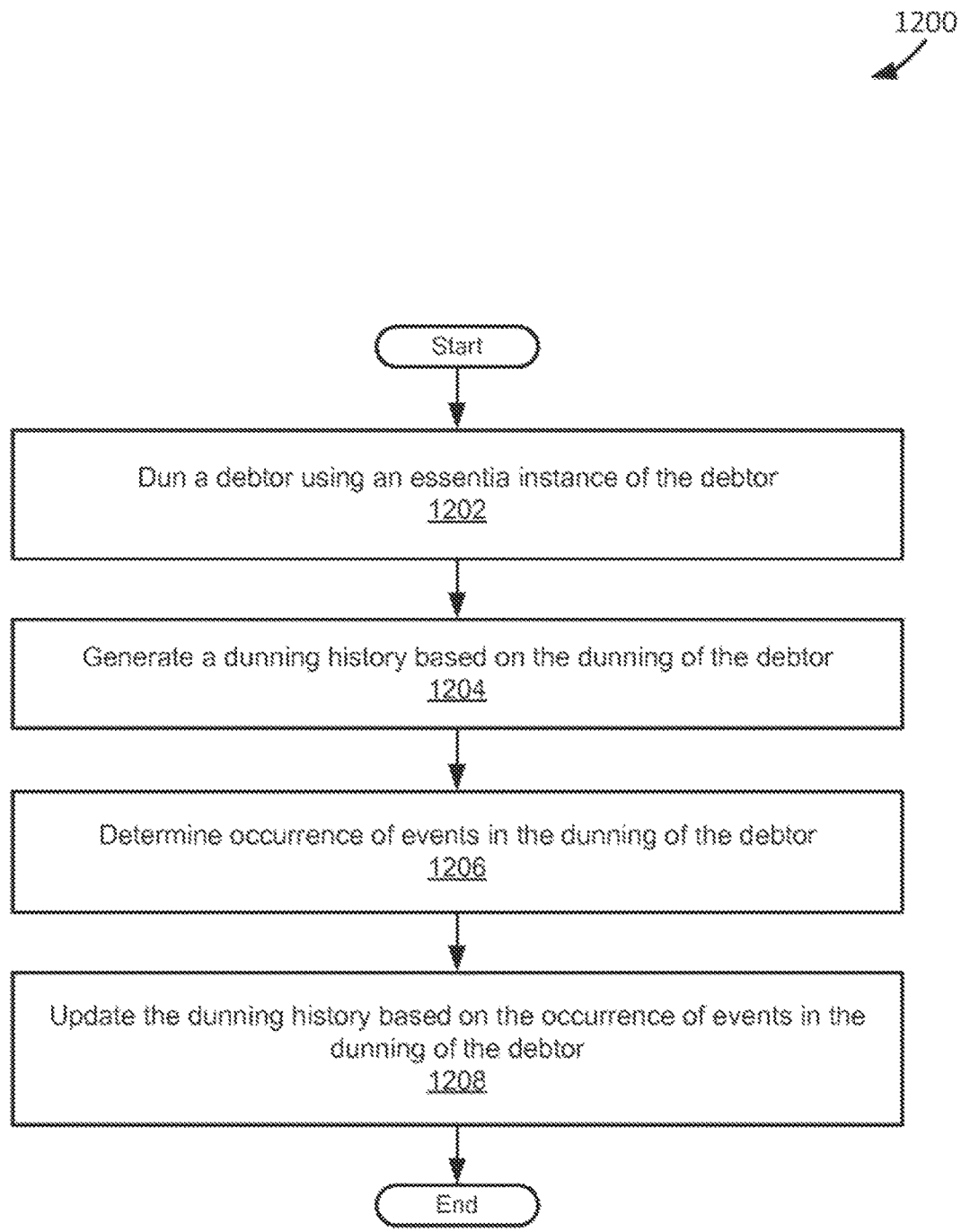
FIG. 12 depicts a flowchart of an example of a method for generating a dunning history for dunning of a debtor.

FIG. 12 depicts a flowchart 1200 of an example of a method for generating a dunning history for dunning of a debtor. The flowchart 1200 begins at module 1202 where a debtor is dunned using an essentia instance of the debtor. An applicable engine for dunning a debtor, such as the dunning engines described in this paper, can function to dun the debtor according to an essentia instance of the debtor. In dunning a debtor using an essentia instance of the debtor, the debtor can be dunned according to essentia specific dunning decisions corresponding to an essentia to which the debtor has been mapped. A debtor can be mapped to an essentia based on characteristic variables of the debtor and characteristic variables of a group of individuals defining the essentia.

The flowchart 1200 continues to module 1204, where a dunning history is generated based on the dunning of the debtor. An applicable engine for generating a dunning history, such as the dunning history management engines described in this paper, can generate the dunning history based on the dunning of the debtor. In generating a dunning history, times and contents at which dunning messages are sent to the debtor can be recorded.

The flowchart 1200 continues to module 1206, where events occurring in the dunning of the debtor are determined. An applicable engine for determining events occurring in dunning of a debtor, such as the dunning history management engines described in this paper, can determine events occurring in the dunning of the debtor. Events occurring in the dunning of the debtor can include the occurrence of an event in response to sending a dunning message to the debtor. For example, an event occurring in the dunning of the debtor can include that the debtor has not responded to receipt of a dunning message.

The flowchart 1200 continues to module 1208, where the dunning history is updated based on the occurrence of events in the dunning of the debtor. An applicable engine for managing a dunning history, such as the dunning history management engines described in this paper, can update the dunning history based on the occurrence of event in the dunning of the debtor. For example, if the debtor does not respond to a dunning message, then the dunning history can be updated to indicate that the event occurred where the debtor did not respond to the dunning message.

Figure 13:
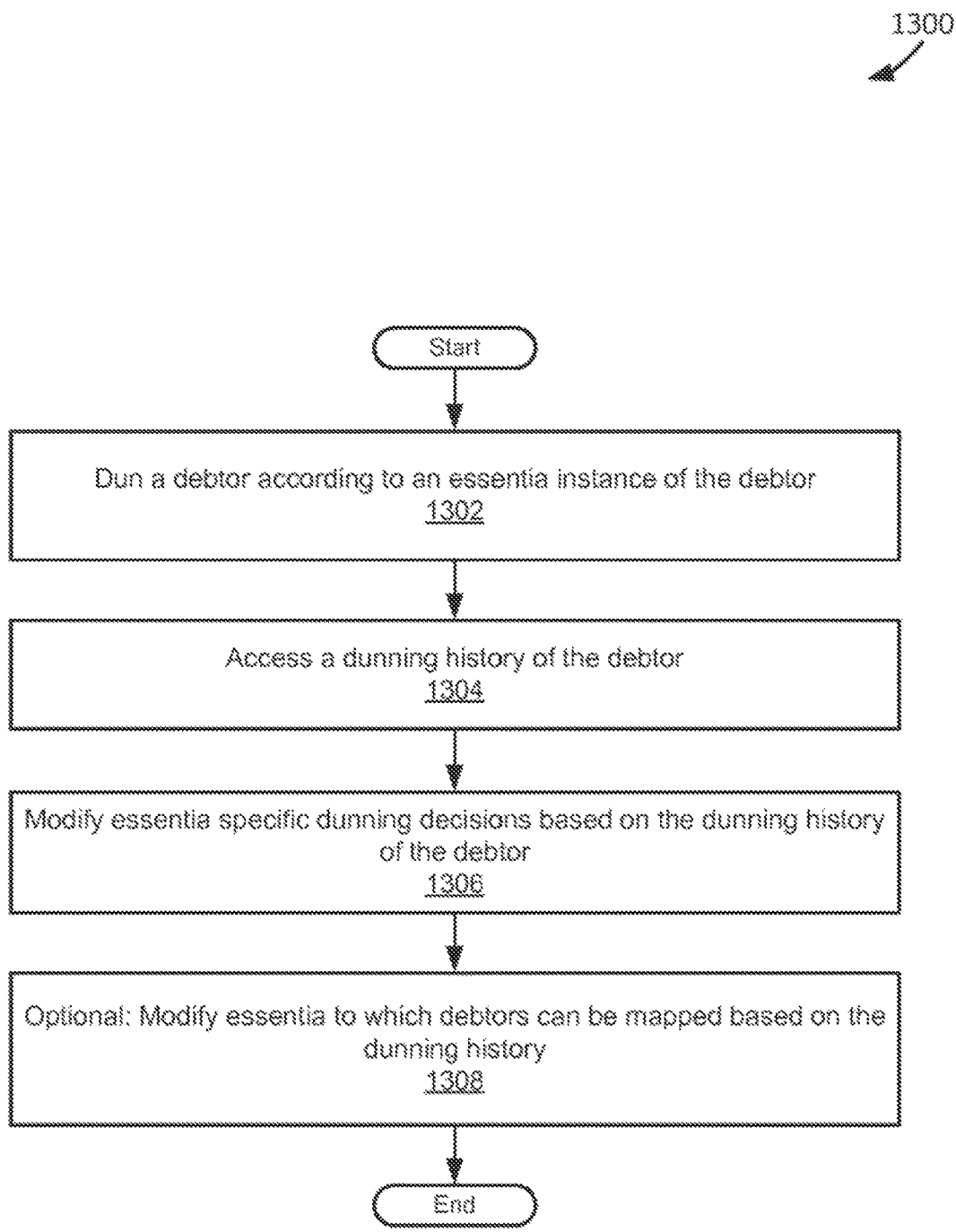
FIG. 13 depicts a flowchart of an example of a method for managing essentia specific dunning decisions based on dunning history.

FIG. 13 depicts a flowchart 1300 of an example of a method for managing essentia specific dunning decisions based on dunning history. The flowchart 1300 begins at module 1302, where a debtor is dunning according to an essentia instance of the debtor. An applicable engine for dunning a debtor, such as the dunning engines described in this paper, can function to dun the debtor according to an essentia instance of the debtor. In dunning a debtor using an essentia instance of the debtor, the debtor can be dunned according to essentia specific dunning decisions corresponding to an essentia to which the debtor has been mapped. A debtor can be mapped to an essentia based on characteristic variables of the debtor and characteristic variables of a group of individuals defining the essentia.

The flowchart 1300 continues to module 1304, where a dunning history of the debtor is accessed. An applicable engine for accessing a dunning history, such as the essentia specific dunning decisions improvement engines and/or the essentia adaption engines described in this paper, can access the dunning history of the debtor. The dunning history of the debtor can include dunning messages sent to the debtor and events occurring in response to the dunning messages being sent to the debtor.

The flowchart 1300 continues to module 1306, where essentia specific dunning decisions are modified based on the dunning history of the debtor. An applicable engine for modifying essentia specific dunning decisions, such as the essentia specific dunning decisions improvement engines described in this paper, can modify the essentia specific dunning decisions. Depending upon implementation-specific or other considerations, essentia specific dunning decisions corresponding to the essentia instance of the debtor can be modified based on the dunning history of the debtor.

The flowchart 1300 continues to module 1308, where optionally, essentia to which debtors can be mapped are modified based on the dunning history. An applicable engine for modifying essentia, such as the essentia adaption engines described in this paper, can modify essentia according to the dunning history. For example, an essentia can be modified by restricting characteristic variables that define the essentia according to characteristic variables.

Figure 14:
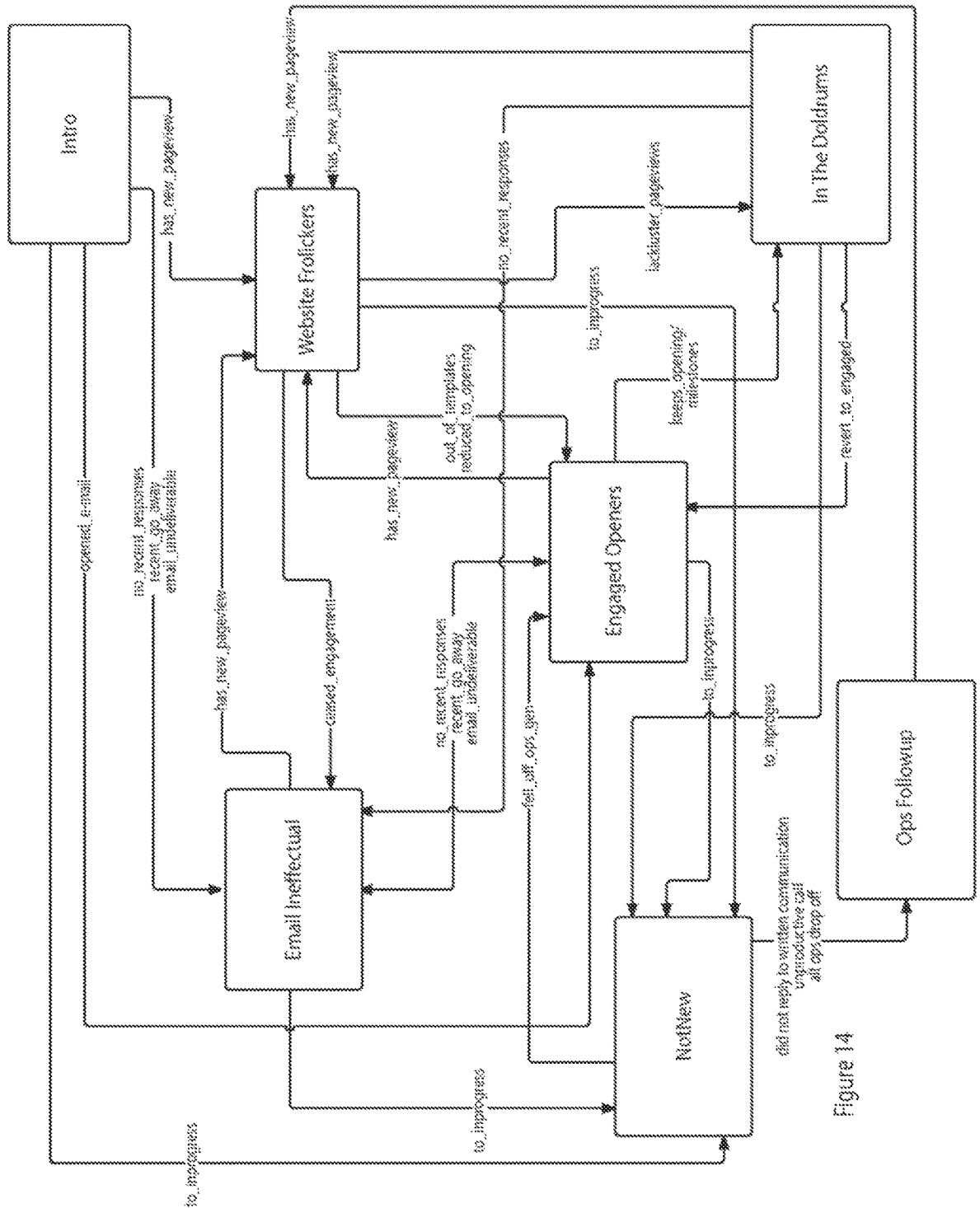
FIG. 14 depicts a flowchart of an example of dunning according to dunning history.

FIG. 14 depicts a flowchart of an example of dunning according to dunning history.

Figure 15:
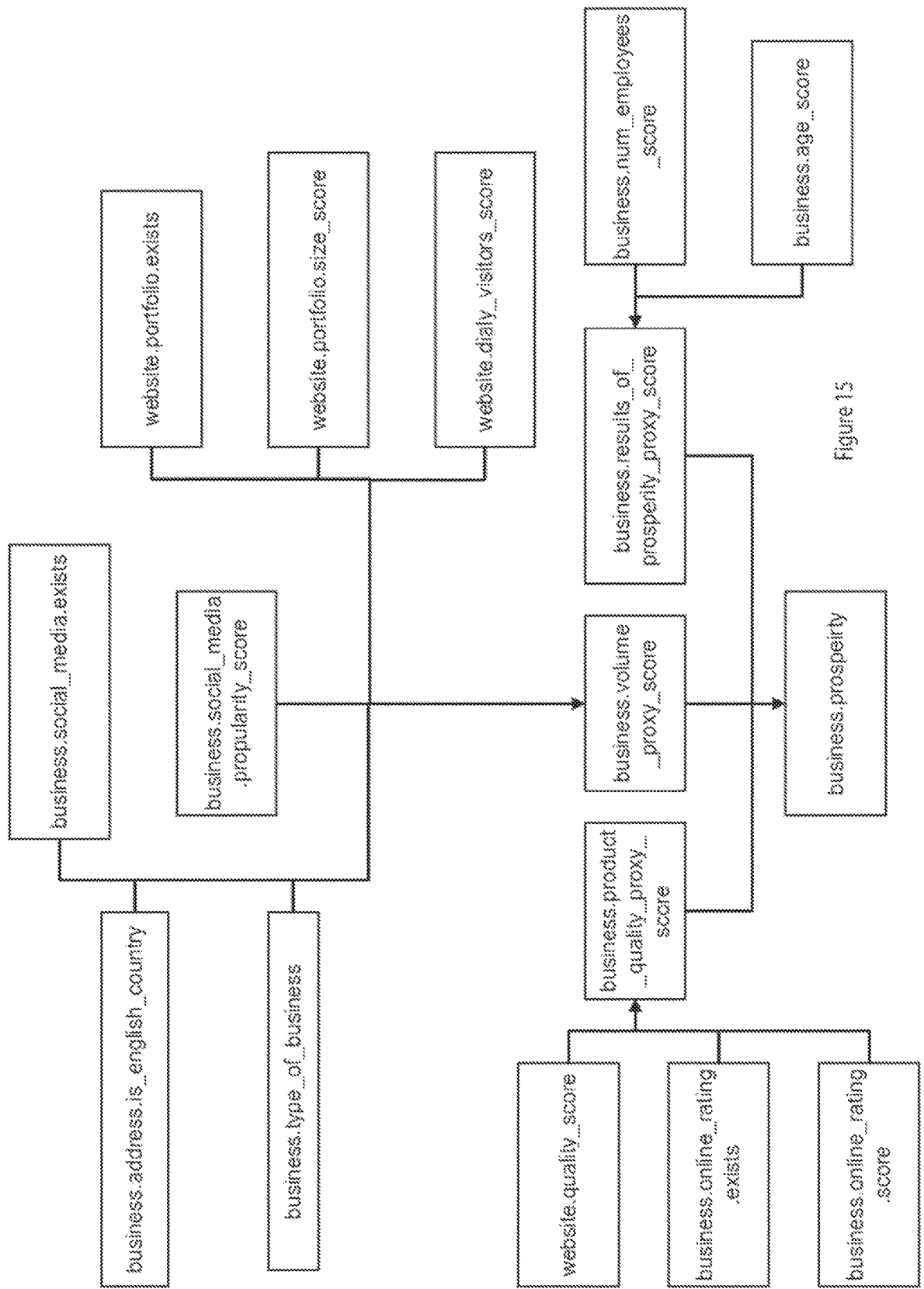
FIG. 15 depicts a flowchart of managing essential specific dunning decisions.

FIG. 15 depicts a flowchart of managing essential specific dunning decisions.

The following corresponds to dunning decisions based on location.

```
Type: Boolean
Calculation:
[M] address country_code in list_english_countries
```

The following corresponds to dunning decisions based on business type.

```
Type: Categorical
Categories
Web_website_services.
Web_others, brick_and mortar
Where website_services is the one stop web service shop
```

The following corresponds to dunning decisions based on a social media profile of a business.

```
Type: Boolean
Were we able to find social media profiles related to the business.
Calculation:
[M] look for links to social media on website
True if any are found
Social_media = [facebook, twitter]
```

The following corresponds to dunning decisions based on a social media popularity score of a business.

```
Type: numeric in [-1, 1]
Calculation:
[M] average of facebook and twitter score, where
facebook and twitter scores normalizations of
likes and followers.
Normalization mapping:
Raw_bins=[0, 10, 100, 1000, 10000]
Scores = [-1, -0.5, 0, 0.5, 1]
```

The following corresponds to dunning decisions based on a web portfolio.
Type: Boolean
If the company is a one-stop web design shop, do they have a portfolio?

The following corresponds to dunning decisions based on web portfolio size.

```
Type: numeric in [-1, 1]
How many client cases to they have in their portfolio
Normalization: TBD
```

The following corresponds to dunning decisions based on web daily visitors score.

```
Type: numeric in [-1, 1]
Calculation:
[M] normalized version of daily_visitors.
Normalization mapping TBD.
```

The following corresponds to dunning decisions based on website quality.

```
Type: numeric in [-1,1]
Calculation:
[H] tbd
[M] I wonder if there are HTML/CSS features of
the source that can nudge in one of these
directions
Normalization: [Incomplete, poor, high] are ][-1,0,1]
```

The following corresponds to dunning decisions based on business online rating

Type: Boolean

Does a yelp or google review page exist

The following corresponds to dunning decisions based on a business online rating score.

Type: Boolean average rating of review sites

The following corresponds to dunning decisions based on a business product quality score.

```
Type: numeric in [-1, 1]
Calculation:
If business online_rating exists:
Rating = business.online_rating score
else:
Rating = none
Product_quality_score = weighted average
of (0.8 * rating) + (0.2* website quality_score)
```

The following corresponds to dunning decisions based on a business volume score.

```
Type: numeric in [-1, 1]
Calculation:
If social_media exists:
Social_media = social_media popularity_score
else:
If business.is_web and address is_english_country:
social_media = -1.0
else:
social_media = none
if business type == web_service
if portfolio exists:
portfolio = portfolio.size_score
```

```
else:
    portfolio = -0.5
else:
    portfolio = none
Visitors = website.daily_visitors_score
Volume_proxy_score = average([social_media portfolio, visitors])
```

The following corresponds to dunning decisions based on business prosperity.

```
Type: numeric in [-1, 1]
Calculation:
    Average of above 3 scores
```

The following corresponds to dunning decisions based on business number of employee scores.

```
Type: numeric in [-1, 1]
Cascading rule:
    [H] check pages: about us, contact us, our team
    and see how many employees are shown
    [HM] name.linkedin and look for people,
    also_viewed in business
    [HM] name.linkedin num_employees field
Normalization mapping
Num_bins = [1, 3, 6, 10, 20, 50 100]
Score = uniform mapping to [-1, 1] range
```

The following corresponds to dunning decisions based on business age scores.

```
Type: numeric in [-1, 1]
Cascading rule:
    [H] website about us page
    [HM] domain whois website created date
    [HM] earliest post in social_media or blog
    [HM] name job start date on linkedin
Normalization:
    <2=.1
    2-4 = 0
    4+ = 1
```

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

The invention claimed is:

1. A method comprising:
   receiving debtor data of a debtor from a creditor;
   mapping the debtor to a first essentia selected from a plurality of essentias to create a first essentia instance for the debtor based on debtor characteristic variables identified from the debtor data and essentia characteristic variables identified by first essentia data associated with the first essentia;
   determining first essentia specific dunning decisions corresponding to the first essentia to apply when dunning the debtor;
   dunning the debtor according to the first essentia specific dunning decisions, wherein dunning the debtor according to the first essentia specific dunning decisions further comprises:
      generating a dunning message according to the first essentia specific dunning decisions, the first essentia specific dunning decisions indicating message attributes for the dunning message, the message attributes including message format information defining how the dunning message will be presented to the debtor on a debtor computer system; and
      sending the dunning message according to the first essentia specific dunning decisions;
   generating a dunning history for the debtor based on the dunning; and
   modifying based on the dunning history one of (a) the first essentia data indicating the essentia specific dunning decisions, such that dunning of a debtor is carried out according to modified essentia specific dunning decisions indicated by the modified first essentia data, (b) the first essentia data indicating the essentia characteristic variables, such that future mapping of the debtor is carried out according to modified essentia characteristic variables identified by the modified first essentia data, and (c) the plurality of essentias based on the dunning history, such that a future mapping of the debtor may cause the debtor to be mapped to a different essentia selected from the plurality of essentias, such that dunning of the debtor is carried out according to different essentia specific dunning decisions indicated by the different essentia.

2. The method of claim 1, further comprising:
   determining occurrences of events during the dunning;
   modifying the dunning history for the debtor based on the occurrences of events.

3. The method of claim 1, further comprising:
   collecting dunning regulations data indicating dunning regulations;
   associating at least portions of the dunning regulations data with specific geographical regions to create geographic dunning regulations data;
   determining a geographical region associated with the debtor from the debtor data;
   establishing applicable dunning regulations for the debtor based on the geographical region associated with the debtor from the geographic dunning regulations data;
   dunning the debtor according to, at least in part, the applicable dunning regulations for the debtor.

4. The method of claim 1, wherein modifying the plurality of essentias to which debtors can be mapped includes modifying characteristic variables that define at least one essentia of the plurality of essentias.

5. The method of claim 1, further comprising:
   receiving input from the creditor;
   modifying the first essentia specific dunning decisions according to the input from the creditor.

6. The method of claim 1, wherein the debtor is mapped to the first essentia based on whether a threshold number of the debtor characteristic variables match the essentia characteristic variables.

7. The method of claim 1, wherein the debtor is mapped to the first essentia based on whether a threshold number of the debtor characteristic variables are related to the essentia characteristic variables.

8. The method of claim 1, wherein modifying the plurality of essentias comprises:
   determining whether the generated dunning history includes a favorable dunning history or an unfavorable dunning history;
   upon determining that the generated dunning history includes a favorable dunning history, modifying the plurality of essentias so as to motivate generation and sending of a dunning message that led to the favorable dunning history;

upon determining that the generated dunning history includes an unfavorable dunning history, modifying the plurality of essentias so as to restrict generation and sending of a dunning message that led to the unfavorable dunning history.

9. A system comprising:

a creditor interface configured to receive debtor data of a debtor from a creditor;

a debtor essentia mapping engine configured to map the debtor to a first essentia selected from a plurality of essentias to create a first essentia instance for the debtor based on debtor characteristic variables identified from the debtor data and essentia characteristic variables identified by first essentia data associated with the first essentia;

a dunning engine configured to
 determine first essentia specific dunning decisions corresponding to the first essentia to apply when dunning the debtor;
 dun the debtor according to the first essentia specific dunning decisions, wherein to dun the debtor according to the first essentia specific dunning decisions further comprises:
  generate a dunning message according to the first essentia specific dunning decisions, the first essentia specific dunning decisions indicating message attributes for the dunning message, the message attributes including message format information defining how the dunning message will be presented to the debtor on a debtor computer system;
  send the dunning message according to the first essentia specific dunning decisions;

a dunning history management engine configured to generate a dunning history for the debtor based on the dunning;

an essentia adaption engine configured to modify based on the dunning history one of (a) the first essentia data indicating the essentia specific dunning decisions, such that dunning of a debtor is carried out according to modified essentia specific dunning decisions indicated by the modified first essentia data, (b) the first essentia data indicating the essentia characteristic variables, such that future mapping of the debtor is carried out according to modified essentia characteristic variables identified by the modified first essentia data, and (c) the plurality of essentias based on the dunning history, such that a future mapping of the debtor may cause the debtor to be mapped to a different essentia selected from the plurality of essentias, such that dunning of the debtor is carried out according to different essentia specific dunning decisions indicated by the different essentia.

10. The system of claim 9, wherein the dunning history management engine is further configured to:
 determine occurrences of events during the dunning;
 modify the dunning history for the debtor based on the occurrences of events.

11. The system of claim 9, further comprising:
 a dunning regulations retrieval engine configured to collect dunning regulations data indicating dunning regulations;
 a dunning regulations management engine configured to associate at least portions of the dunning regulations data with specific geographical regions to create geographic dunning regulations data;
 an applicable dunning regulations determination engine configured to:
  determine a geographical region associated with the debtor from the debtor data;
  establish applicable dunning regulations for the debtor based on the geographical region associated with the debtor from the geographic dunning regulations data;
 the dunning engine further configured to dun the debtor according to, at least in part, the applicable dunning regulations for the debtor.

12. The system of claim 9, further comprising:
 an essentia adaption engine configured to modify the plurality of essentias to which debtors can be mapped includes to modify characteristic variables that define at least one essentia of the plurality of essentias.

13. The system of claim 9, wherein
 the creditor interface is further configured to receive input from the creditor;
 the essentia specific dunning decisions improvement engine is further configured to modify the essentia specific dunning decisions according to the input from the creditor.

14. The system of claim 9, wherein the debtor essentia mapping engine is further configured to map the debtor to the first essentia based on whether a threshold number of the debtor characteristic variables match the essentia characteristic variables.

15. The system of claim 9, wherein the debtor essentia mapping engine is further configured to map the debtor to the first essentia based on whether a threshold number of the debtor characteristic variables are related to the essentia characteristic variables.

16. The system of claim 9, wherein the essentia specific dunning decisions improvement engine is further configured to:
 determine whether the generated dunning history includes a favorable dunning history or an unfavorable dunning history;
 upon determining that the generated dunning history includes a favorable dunning history, modify the plurality of essentias so as to motivate generation and sending of a dunning message that led to the favorable dunning history;
 upon determining that the generated dunning history includes an unfavorable dunning history, modify the plurality of essentias so as to restrict generation and sending of a dunning message that led to the unfavorable dunning history.

17. A system comprising:

means for receiving debtor data of a debtor from a creditor;

means for mapping the debtor to a first essentia selected from a plurality of essentias to create a first essentia instance for the debtor based on debtor characteristic variables identified from the debtor data and essentia characteristic variables identified by first essentia data associated with the first essentia;

means for determining first essentia specific dunning decisions corresponding to the first essentia to apply when dunning the debtor;

means for dunning the debtor according to the first essentia specific dunning decisions, wherein the means for dunning the debtor according to the first essentia specific dunning decisions further comprises:

means for generating a dunning message according to the first essentia specific dunning decisions, the first essentia specific dunning decisions indicating message attributes for the dunning message, the message attributes including message format information defining how the dunning message will be presented to the debtor on a debtor computer system; and means for sending the dunning message according to the first essentia specific dunning decisions;

means for generating a dunning history for the debtor based on the dunning; and means for modifying based on the dunning history one of (a) the first essentia data indicating the essentia specific dunning decisions, such that dunning of a debtor is carried out according to modified essentia specific dunning decisions indicated by the modified first essentia data, (b) the first essentia data indicating the essentia characteristic variables, such that future mapping of the debtor is carried out according to modified essentia characteristic variables identified by the modified first essentia data, and (c) the plurality of essentias based on the dunning history, such that a future mapping of the debtor may cause the debtor to be mapped to a different essentia selected from the plurality of essentias, such that dunning of the debtor is carried out according to different essentia specific dunning decisions indicated by the different essentia.

\* \* \* \* \*